(12) United States Patent
Kim et al.

(10) Patent No.: US 10,887,833 B2
(45) Date of Patent: *Jan. 5, 2021

(54) METHOD BY WHICH REMOTE TERMINAL SELECTS RELAY TERMINAL IN SITUATION IN WHICH ACCESS CONTROL IS APPLIED BECAUSE OF NETWORK CONGESTION, AND REMOTE TERMINAL FOR PERFORMING METHOD

(71) Applicant: LG Electronics Inc., Seoul (KR)

(72) Inventors: Jaehyun Kim, Seoul (KR); Laeyoung Kim, Seoul (KR); Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/485,115

(22) PCT Filed: Jan. 18, 2018

(86) PCT No.: PCT/KR2018/000849
§ 371 (c)(1),
(2) Date: Aug. 9, 2019

(87) PCT Pub. No.: WO2018/147567
PCT Pub. Date: Aug. 16, 2018

(65) Prior Publication Data
US 2020/0045626 A1 Feb. 6, 2020

Related U.S. Application Data

(60) Provisional application No. 62/474,070, filed on Mar. 20, 2017, provisional application No. 62/457,179, filed on Feb. 10, 2017.

(51) Int. Cl.
*H04W 48/20* (2009.01)
*H04W 28/02* (2009.01)
(Continued)

(52) U.S. Cl.
CPC .......... *H04W 48/20* (2013.01); *H04W 48/06* (2013.01); *H04W 88/04* (2013.01); *H04W 92/18* (2013.01)

(58) Field of Classification Search
CPC ..... H04W 48/20; H04W 48/06; H04W 36/30; H04W 92/18; H04W 88/04;
(Continued)

(56) References Cited

U.S. PATENT DOCUMENTS

2016/0044727 A1 2/2016 Zisimopoulos et al.
2016/0205532 A1* 7/2016 Chen ................ H04W 4/70
370/328

(Continued)

FOREIGN PATENT DOCUMENTS

CN 105992275 10/2016
WO WO2016024773 2/2016
(Continued)

OTHER PUBLICATIONS

Extended European Search Report in European Application No. 18751988.9, dated Jul. 16, 2020, 18 pages.
(Continued)

*Primary Examiner* — Khawar Iqbal
(74) *Attorney, Agent, or Firm* — Fish & Richardson P.C.

(57) ABSTRACT

One disclosure of the present specification provides a method by which a remote terminal selects any one from among relay terminals in a situation in which access control is applied because of network congestion. The method can comprise the steps of: receiving first information related to the access control from at least one of the relay terminals; comparing the first information with second information which is possessed by the remote terminal; selecting, from among the relay terminals, the relay terminal having transmitted the first information, when the first information
(Continued)

completely coincides with the second information; and attempting a connection with the selected relay terminal.

13 Claims, 18 Drawing Sheets

(51) Int. Cl.
*H04W 48/06* (2009.01)
*H04W 88/04* (2009.01)
*H04W 92/18* (2009.01)

(58) Field of Classification Search
CPC ....... H04W 36/00837; H04W 36/0085; H04W 36/00; H04W 36/03; H04W 36/08; H04W 4/70; H04B 17/309; H04B 7/15
See application file for complete search history.

(56) References Cited

U.S. PATENT DOCUMENTS

| | | | |
|---|---|---|---|
| 2016/0337935 A1 | 11/2016 | Patil et al. | |
| 2017/0366958 A1* | 12/2017 | Ryu | H04W 8/005 |
| 2018/0035354 A1* | 2/2018 | Martin | H04W 40/22 |
| 2018/0092017 A1* | 3/2018 | Freda | H04W 36/36 |
| 2018/0110001 A1* | 4/2018 | Yasukawa | H04W 52/0216 |
| 2018/0138965 A1* | 5/2018 | Martin | H04B 7/15507 |
| 2018/0242393 A1* | 8/2018 | Wei | H04W 76/34 |
| 2018/0279195 A1* | 9/2018 | Kim | H04W 36/22 |
| 2018/0279196 A1* | 9/2018 | Takagi | H04B 7/15528 |
| 2019/0182747 A1* | 6/2019 | Chun | H04W 48/08 |
| 2019/0246333 A1* | 8/2019 | Tenny | H04W 12/08 |
| 2019/0281526 A1* | 9/2019 | Freda | H04W 36/36 |
| 2019/0326979 A1* | 10/2019 | Hwang | H04B 17/309 |
| 2020/0045626 A1* | 2/2020 | Kim | H04W 48/06 |
| 2020/0084835 A1* | 3/2020 | Wang | H04W 48/02 |

FOREIGN PATENT DOCUMENTS

| | | |
|---|---|---|
| WO | WO2016171495 | 10/2016 |
| WO | WO2016184618 | 11/2016 |
| WO | WO2016200184 | 12/2016 |

OTHER PUBLICATIONS

Intel Corporation, "Discussion on Access Control for Evolved Prose Remote UE," S1-170113, 3GPP TSG-SA WG1 Meeting #76bis, Spokane, WA, USA, dated Jan. 16-20, 2017, 9 pages.

* cited by examiner

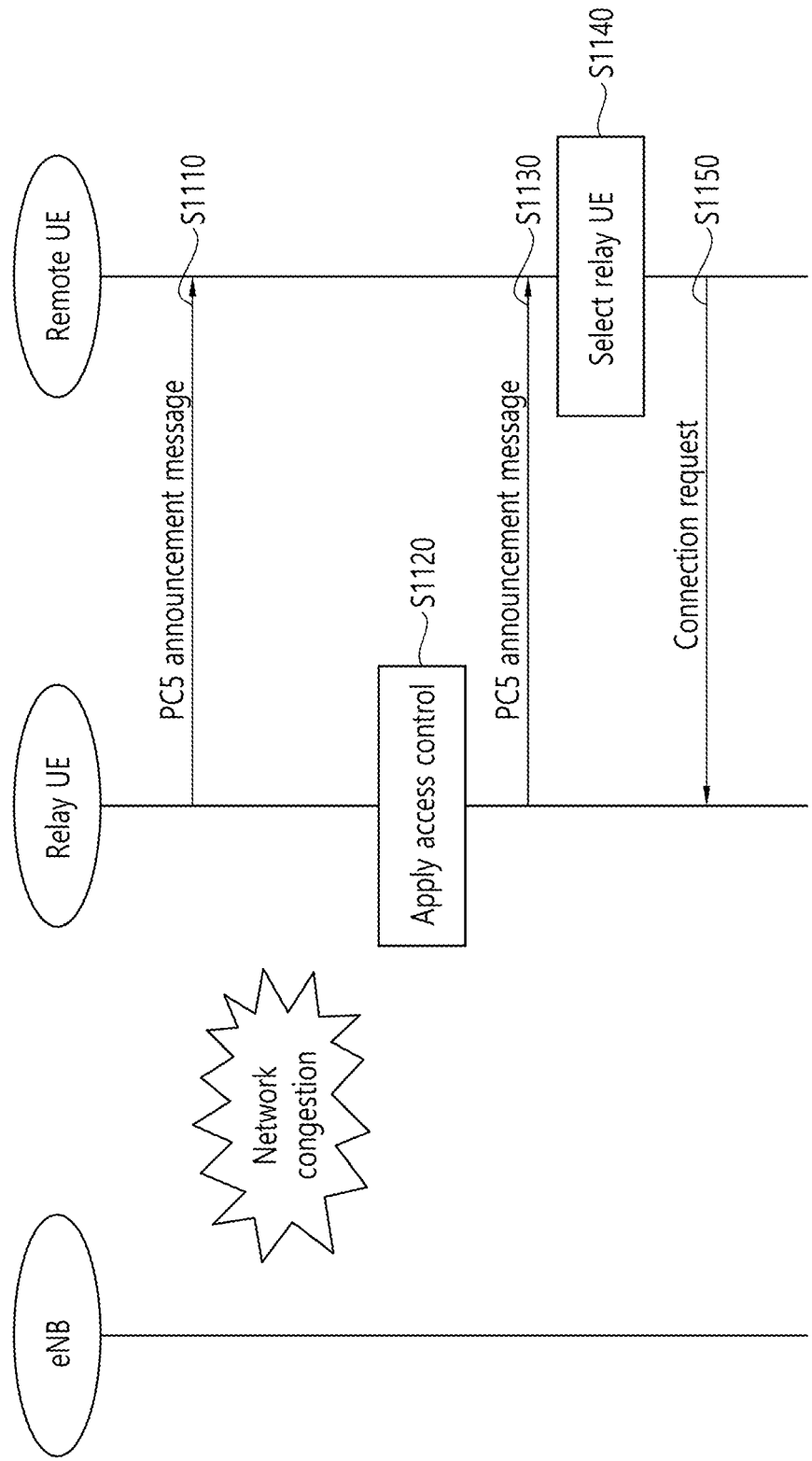

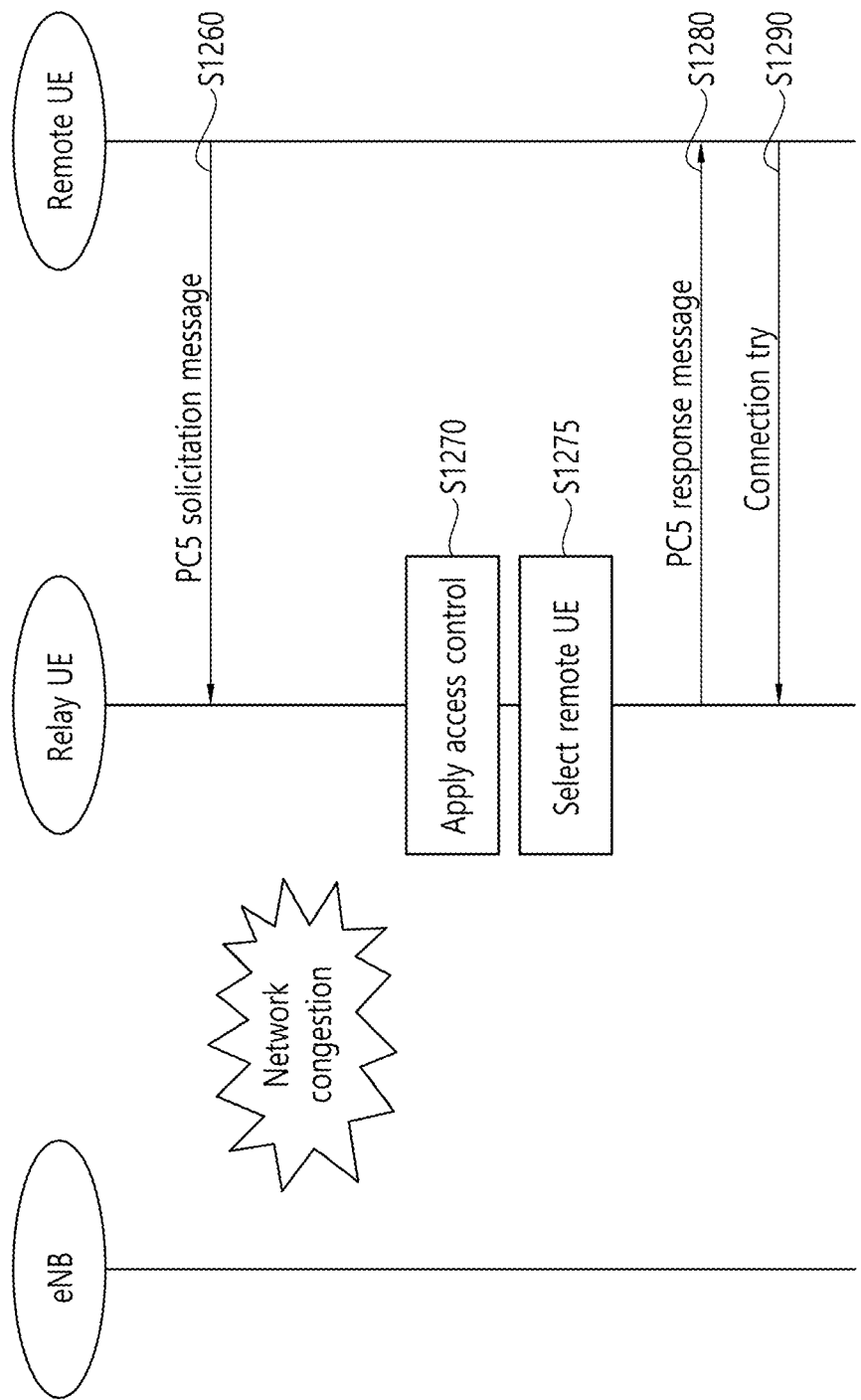

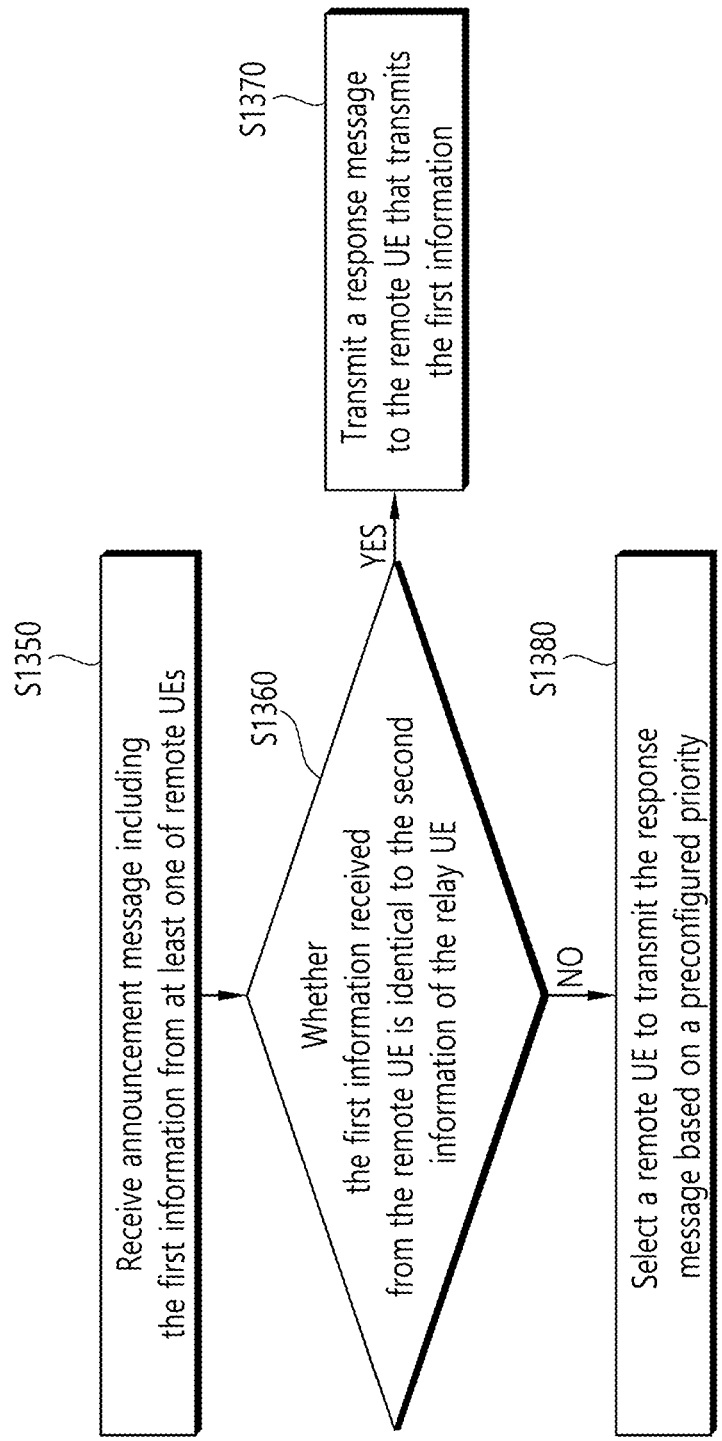

METHOD BY WHICH REMOTE TERMINAL SELECTS RELAY TERMINAL IN SITUATION IN WHICH ACCESS CONTROL IS APPLIED BECAUSE OF NETWORK CONGESTION, AND REMOTE TERMINAL FOR PERFORMING METHOD

CROSS-REFERENCE TO RELATED APPLICATIONS

This application is a National Stage application under 35 U.S.C. § 371 of International Application No. PCT/KR2018/000849, filed on Jan. 18, 2018, which claims the benefit of U.S. Provisional Application No. 62/474,070, filed on Mar. 20, 2017, and U.S. Provisional Application No. 62/457,179, filed on Feb. 10, 2017. The disclosures of the prior applications are incorporated by reference in their entirety.

BACKGROUND OF THE INVENTION

Field of the Invention

The present invention relates to a method for a remote terminal to select one of relay terminals that provide information for an access control in a situation in which the access control is applied owing to network congestion.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during |

TABLE 1-continued

| REFERENCE POINT | DESCRIPTION |
|---|---|
| | handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARD). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5*a* is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 6 shows the network overload state.

As shown in FIG. 6, the coverage of the eNodeB 200 contains a large number of UEs 100a, 100b, 100c, and 100d, which attempt data transmission/reception. As a result, if traffic in the interface between the eNodeB 200 and the S-GW 520 is overloaded or congested, the downlink data to the UE 100 or the uplink data from the UE 100 fails to be transmitted correctly.

Alternatively, if the interface between the S-GW 520 and the PDN-GW 530 or the interface between the PDN-GW 530 and a IP service network of a mobile communication provider 600 is overloaded or congested, the downlink data to the UEs 100a, 100b, 100c, and 100d or the uplink data from the UEs 100a, 100b, 100c, and 100d fails to be transmitted correctly.

If the interface between the eNodeB 200 and the S-GW 520 has an overload or congestion state, or if the interface between the S-GW 520 and the PDN-GW 530 has an overload or congested state, a node of the core network (e.g., MME) performs congestion control (NAS level congestion control) at the NAS level to avoid or control signaling congestion and APN congestion.

The congestion control at the NAS level includes an APN-based congestion control and a general NAS level mobility management control.

The APN-based congestion control refers to the EMM, GMM and (E) SM signaling congestion control associated with UE and specific APN and includes the APN-based session management congestion control and th4e APN-based mobility management congestion control.

To the contrary, in the general NAS level mobility management control, a node (MME and SGSN) in the core network rejects the Mobility Management signaling request requested by the UE/MS in a general network congestion or overload situation, thus avoiding the congestion and overload.

In general, when the core network performs the NAS level congestion control, the network carries a back-off timer value in the NAS reject message and transmits the message to the UE in an idle mode or in a connected mode. Thus, the UE does not request the EMM/GMM/(E) SM signal to the network until the back-off timer expires. The NAS rejection message includes one of attach rejection, tracking area updating (TAU) rejection, RAU (routing area updating) rejection, service rejection, extended service rejection, PDN connectivity rejection, bearer resource allocation rejection, bearer resource modification rejection, and deactivate EPS bearer context request rejection.

The back-off timer may be divided into Mobility Management (MM) back-off timers and Session Management (SM) back-off timers.

The MM back-off timer operates independently for each UE while the SM back-off timer operates independently for each APN and for each UE.

Briefly, the MM back-off timer is configured for controlling EMM/GMM signal (e.g., Attach, TAU/RAU request, etc.). The SM back-off timer is configured for controlling (E)SM signal (e.g., PDN connectivity, Bearer Resource Allocation, Bearer Modification, PDP Context Activation, PDP Context Modification request, etc.).

Specifically, when a congestion occurs in the network, the MM back-off timer is used to control the congestion in terms of the mobility management. When the timer is activated, the timer disallows the UE to perform attach, location information update (TAU, RAU), service request procedure. However, in the case of an emergency bearer service or multimedia priority service (MPS), the UE may request the signal even when the timer is operating.

As described above, the UE receives the MM back-off timer value from a core network node (e.g., MME, SGSN, etc.) or a lower layer (Access Stratum). Further, the timer may be randomly configured within a range of 15 to 30 minutes by the UE.

When a congestion occurs in the network, the SM back-off timer is used to control the congestion in terms of the session management. When the timer is running, the timer prevents the UE from configuring or modifying the associated APN-based session. However, in the case of an emergency bearer service or a multimedia priority service (MPS), the UE 100 may request the signal even when the timer is operating.

The UE receives the SM back-off timer value from the core network node (e.g., MME, SGSN, etc.) and the timer value is randomly configured within 72 hours by the UE. Further, the timer value be randomly configured within a range of 15 to 30 minutes by the UE 100.

In another example, when congestion occurs in the eNodeB 200, the eNodeB 200 may also perform congestion control. That is, when the UE requests an RRC connection establishment for the purpose of data transmission on the user plane, and when the eNodeB 200 is in the congestion state, the eNodeB 200 may send the rejection response along with an extended wait timer to the UE 100. In this case, the RRC connection establishment request cannot be re-attempted by the UE until the extended wait timer expires. To the contrary, when the UE makes an RRC connection request to transmit a control plane signal for receiving a circuit switch (CS)-based call, the eNodeB cannot reject the request even when the eNodeB 200 is in the congestion state.

FIG. 7 shows an example flow diagram of access barring operation in the network congestion state.

As shown in FIG. 7, in the overload or congestion state of the network or eNodeB 200, the eNodeB 200 may broadcast Access Class Barring (ACB)-related information in the system information. The system information may be SIB (System Information Block) type 2.

The SIB (System Information Block) type 2 may include ACB-related information as shown in a following table.

TABLE 2

| Field | Description |
| --- | --- |
| ac-BarringFactor | If the random value generated by the UE is smaller than the value of ac-BarringFactor, the access is allowed. Otherwise, access is prohibited. |
| ac-BarringForCSFB | ACB for circuit switch (CS) fallback. CS fallback is to convert the VoLTE call to the previous 3G call. |

TABLE 2-continued

| Field | Description |
| --- | --- |
| ac-BarringForEmergency | ACB for emergency service. |
| ac-BarringForMO-Data | ACB for mobile-originating (MO) data. |
| ac-BarringForMO-Signalling | ACB for the mobile-originating control signal. |
| ac-BarringForSpecialAC | ACB for A special access class, that is, 11-15. |
| ac-BarringTime | This indicates the time when access is prohibited. |
| ssac-BarringForMMTEL-Video | Service-specific ACB for mobile-originating of MMTEL video. |
| ssac-BarringForMMTEL-Voice | Service specific ACB for mobile-originating of MMTEL voice. |

In one example, the UE1 100a determines originating of a call by an IMS service, e.g., VoLTE, and generates the service request message. Similarly, UE2 100b determines originating of generic data and generates a service request message.

Then, the UE1 100a generates an RRC connection request message. Similarly, UE2 100b generates an RRC connection request message.

In one example, the UE1 100a performs an access barring check (i.e., ACB application or non-application). Similarly, the UE2 100b performs an access barring check (i.e., ACB application or non-application).

When the ACB is applied, the UE1 100a and the UE2 100b can transmit a service request (or an extended service request) message and an RRC connection request message, respectively. However, when the ACB is applied, the UE1 100a and the UE2 100b cannot transmit the RRC connection request messages.

The access barring check (ABC) is described in detail as follows. The UE is generally randomly assigned at least one of the ten access classes (e.g., AC0, AC1, . . . , AC9). Exceptionally, AC10 is assigned for emergency access. The value of the randomly assigned access class may be stored in each USIM of the UE1 100 and UE2 100b. Then, the UE1 100a and the UE2 100b use a barring factor field included in the received ACB-related information based on the stored access class to check whether the access barring is applied. This access barring check is performed in each AS (Access Stratum) layer of the UE1 100a and the UE2 100b, that is, the RRC layer.

The access barring check is described in more detail below.

When the ac-BarringPerPLMN-List is included in the SIB type 2 received by the UE1 100a and the UE2 100b, and the ac-BarringPerPLMN-List includes an AC-BarringPerPLMN entry matching the plmn-identityIndex corresponding to the PLMN selected by the higher layer, the UE1 100a and the UE2 100b may select the AC-BarringPerPLMN entry matching the PLMN-identityIndex corresponding to the PLMN selected by the higher layer.

Next, when the UE1 100a and the UE2 100b attempt an RRC connection request, the UE1 100a and the UE2 100b may perform an access barring check using T303 as a Tbarring and ac-BarringForMO-Data as a barring parameter.

When the barring is determined, each AS layer (i.e., the RRC layer) of the UE1 100a and UE2 100b informs the higher layer of the failure of the RRC connection establishment.

Then, when the access is barred, each AS layer (i.e., RRC layer) determines whether the T302 timer or the Tbarring timer is running. If it is not running, the AS layer drives the T302 timer or Tbarring timer.

In one example, while the T302 timer or the Tbarring timer is running, the AS layer (i.e., the RRC layer) considers that all accesses to the corresponding cell are barred.

As described above, in the network overload and congestion situations, the eNB/RNC provides ACB (Access Class Barring)-related information to the UE. Then, the UE checks the access barring using a barring factor included in the received ACB information based on the access class stored in the USIM. This access barring check eventually prevents the access attempt. That is, if the access to the corresponding cell is barred via the access barring check, the UE does not attempt to access thereto. If the access to the corresponding cell is not barred, the UE attempts to access thereto. This access barring check is performed by the Access Stratum (AS) layer of the UE. In this connection, the access attempt means transmitting an RRC connection request message from the AS layer (i.e., RRC layer) of the UE to the eNB/RNC.

Meanwhile, the access barring check according to the ACB is performed for a normal Mobile Originating (MO) service of a UE, for example, originating call, originating data, originating IMS voice and originating IMS video. That is, the ACB is applied to accesses of all application programs (however, except an emergency service or a response to paging). Therefore, in the case that it is determined that the ACB is applied first, the accesses (however, except an emergency service or a response to paging) of all applications of the UE are barred.

Accordingly, in a network overload and a congestion situation, to discriminate the Mobile Originating (MO) services (e.g., originating call or originating data) for each of specific application group/category), the Application specific Congestion control for Data Communication (ACDC) is proposed. According to the ACDC, the MO services may be allowed or barred by discriminating for each service request required by the application which is executing in the UE.

Meanwhile, owing to increase of user requirements for the Social Network Service (SNS), it is proposed a proximity communication service between UEs of near distance physically. The proximity communication service may also be referred to as Proximity Service (ProSe). In the ProSe, a UE located in coverage of an eNB may operate as a relay UE for a remote UE. That is, the remote UE may receive a network connectivity service through the relay UE. However, in the case that the access control is applied owing to a network congestion, the remote UE may not establish an RRC connection or may not use a specific service and/or application.

At this time, even in the case that the network congestion occurs, the remote UE may request the network connectivity service, not knowing the network congestion situation. Owing to this, there is a problem that a resource is wasted, a battery is consumed and delay in a service connectivity is caused. In addition, currently, in 3GPP, in the case that network congestion situation occurs, there is problem that it is unclear whether a control is performed by a remote UE or a relay UE.

SUMMARY OF THE INVENTION

Accordingly, an object of a disclosure of the present invention is to propose a method for solving the problem described above. More particularly, an object of a disclosure of the present invention is to propose a method for a remote UE to select a relay UE in a situation in which an access control is applied owing to network congestion and a remote UE for performing the method.

To attain the object described above, a disclosure of the present specification provides a method for a remote UE to select one of relay UEs in a situation in which an access control is applied owing to network congestion. The method may include receiving first information for the access control from at least one of the relay UEs; comparing the first information with second information of the remote UE; selecting a relay UE that transmits the first information among the relay UEs, when information included in the first information is completely identical to information included in the second information; selecting a relay UE among the relay UEs according to a priority, when information included in the first information is not completely identical to information included in the second information of the remote UE; and trying a connection with the selected relay UE.

The first information may include access class information of the relay UE, access control mechanism information of the relay UE and configuration information of the relay UE.

The second information may include access class information of the remote UE, access control mechanism information of the remote UE and configuration information of the remote UE.

The priority may represent an order of determining whether the access class information of the remote UE, the access control mechanism information of the remote UE and the configuration information of the remote UE included in the second information is identical to the first information.

The step of selecting the relay UE among the relay UEs may include: determining firstly whether a relay UE having the access class information identical to the access class information of the remote UE is present based on the priority; and selecting the relay UE having the identical access class information, when a relay UE having the access class information identical to the access class information of the remote UE is present, as a result of the first determination.

The step of selecting the relay UE among the relay UEs may further include: determining secondly whether a relay UE having the configuration information identical to the configuration information of the remote UE is present, when a relay UE having the access class information identical to the access class information of the remote UE is not present, as a result of the first determination; and selecting the relay UE having the identical configuration information, when a relay UE having the configuration information identical to the configuration information of the remote UE is present, as a result of the second determination, wherein the configuration information includes at least one of Non-Access Stratum (NAS) signaling low priority indicator and Overriding NAS signaling low priority indicator.

The step of selecting the relay UE among the relay UEs may further include: determining thirdly whether a relay UE having Extended Access Barring (EAB) information and overriding EAB information identical to EAB information and overriding EAB information of the remote UE is present, when a relay UE having the configuration information identical to the configuration information of the remote UE is not present, as a result of the second determination; and selecting the relay UE having the identical EAB information and overriding EAB information, when a relay UE having the EAB information and overriding EAB information identical to the EAB information and overriding EAB information of the remote UE is present, as a result of the third determination.

The step of selecting the relay UE among the relay UEs may further include: determining fourthly whether a relay UE having Application specific Congestion control for Data Communication (ACDC) information among the access control mechanism information identical to ACDC information of the remote UE is present among the access control mechanism information, when a relay UE having the EAB information and overriding EAB information identical to the EAB information and overriding EAB information of the remote UE is not present, as a result of the third determination; and selecting the relay UE having the identical ACDC information, when a relay UE having the ACDC information identical to the EAB information and overriding EAB information of the remote UE is present, as a result of the fourth determination.

The first information may further include information related to the access control and information related to a start of the access control, and wherein the remote UE identifies that the access control by the relay UE is started by using one information included in the first information.

The remote UE may reselect another relay UE, not the relay UE selected based on one information included in the first information, when the remote UE identifies that the access control is started.

The first information may include a relay service code and a user information ID of the relay UE, and wherein the second information may include a relay service code and a user information ID of the remote UE.

The step of selecting the relay UE that transmits the first information may include: selecting a relay UE of which a signal strength is a strongest among the relay UEs that transmit the first information, when a plurality of relay UEs that transmits first information completely identical to the second information is present.

The step of selecting the relay UE that transmits the first information may include: selecting a relay UE based on a service provider policy or a configuration of network, when a plurality of relay UEs that transmits first information completely identical to the second information is present.

To attain the object described above, another disclosure of the present specification provides a remote UE for selecting one of relay UEs in a situation in which an access control is applied owing to network congestion. The remote UE may include a Radio Frequency (RF) unit configured to receive first information for the access control from at least one of the relay UEs; and a processor configured to control the RF unit, wherein the processor is configured to: compare the first information with second information of the remote UE; select a relay UE that transmits the first information among the relay UEs, when information included in the first information is completely identical to information included in the second information; select a relay UE among the relay UEs according to a priority, when information included in the first information is not completely identical to information included in the second information of the remote UE; and try a connection with the selected relay UE, wherein the first information includes access class information of the relay UE, access control mechanism information of the relay UE and configuration information of the relay UE and wherein the second information includes access class information of the remote UE, access control mechanism information of the remote UE and configuration information of the remote UE.

According to a disclosure of the present specification, a criterion is provided for selecting one of relay UEs that provide information for an access control, and unnecessary waste of resource is prevented, and battery consumption and service connectivity delay may be prevented.

BRIEF DESCRIPTION OF THE DRAWINGS

FIG. 11 illustrates a method for a remote UE to select a relay UE for trying a connection in Discovery model A.

FIG. 12b illustrates a method for a relay UE to select a remote UE to transmit a response message in Discovery model B.

FIG. 13b is a flowchart illustrating a procedure that a relay UE selects a remote UE to transmit a response message in a situation in which the access control is applied owing to network congestion according to an embodiment of the present specification.

DESCRIPTION OF EXEMPLARY EMBODIMENTS

Figure 1:
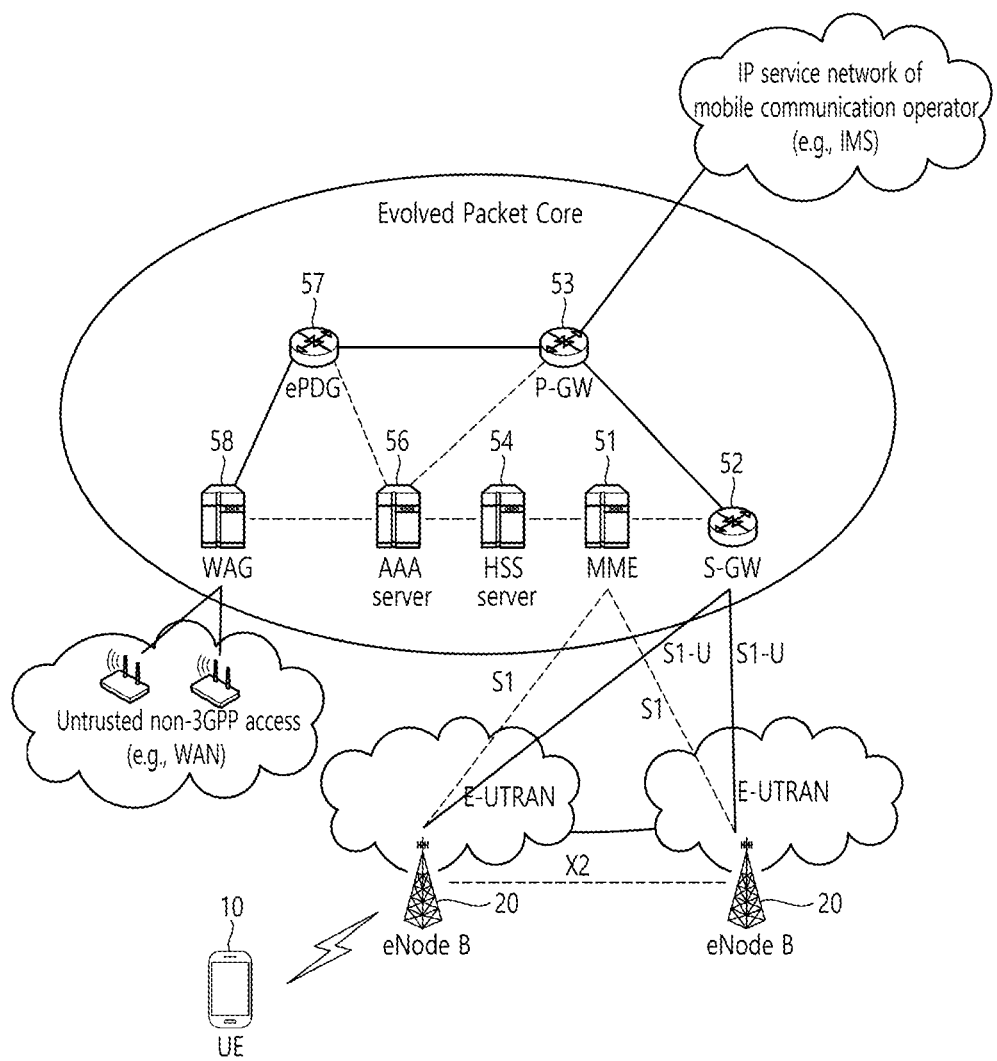
FIG. 1 is a structural diagram of an evolved mobile communication network.
Figure 2:
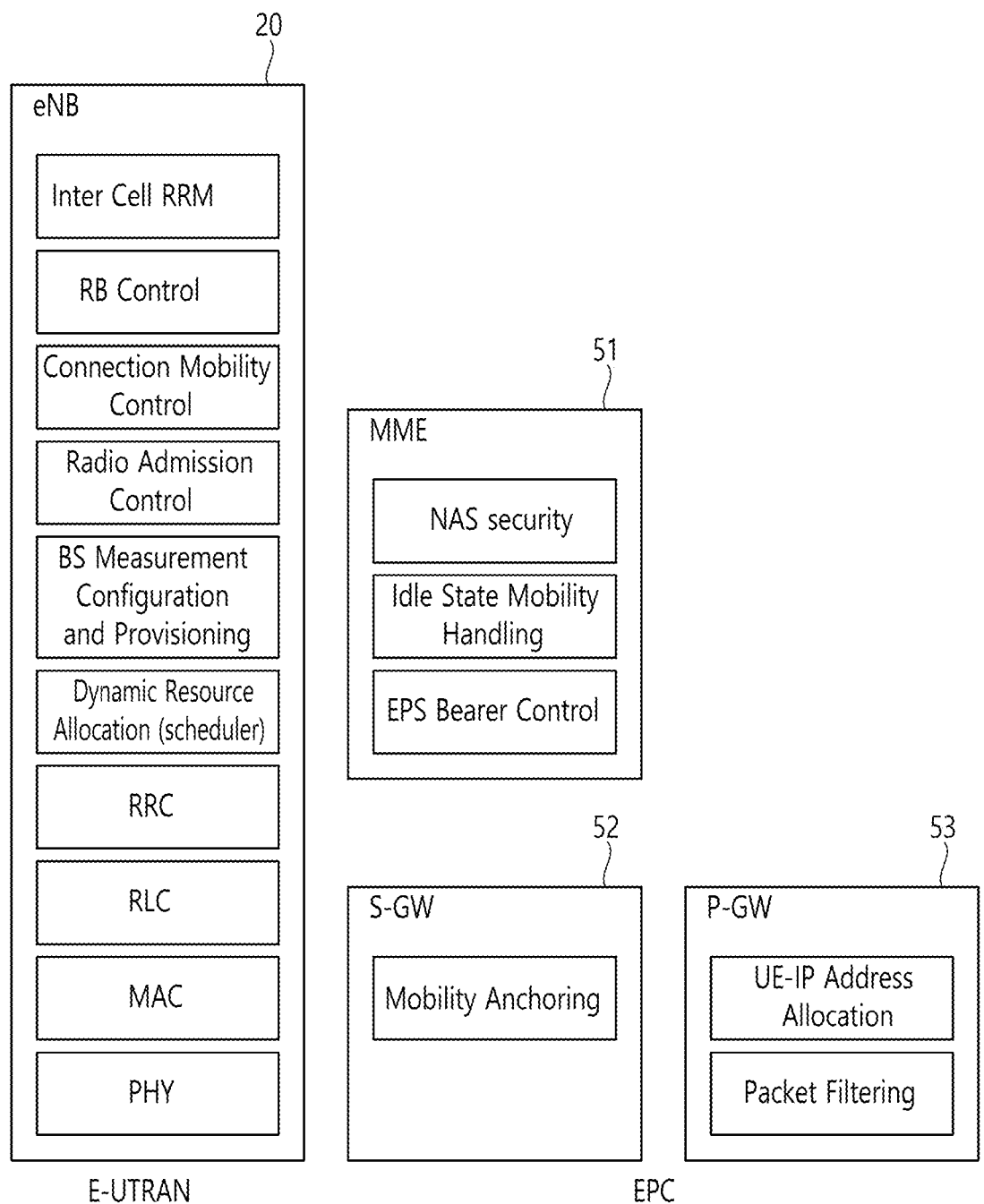
FIG. 2 is an exemplary diagram illustrating architectures of a general E-UTRAN and a general EPC.
Figure 3:
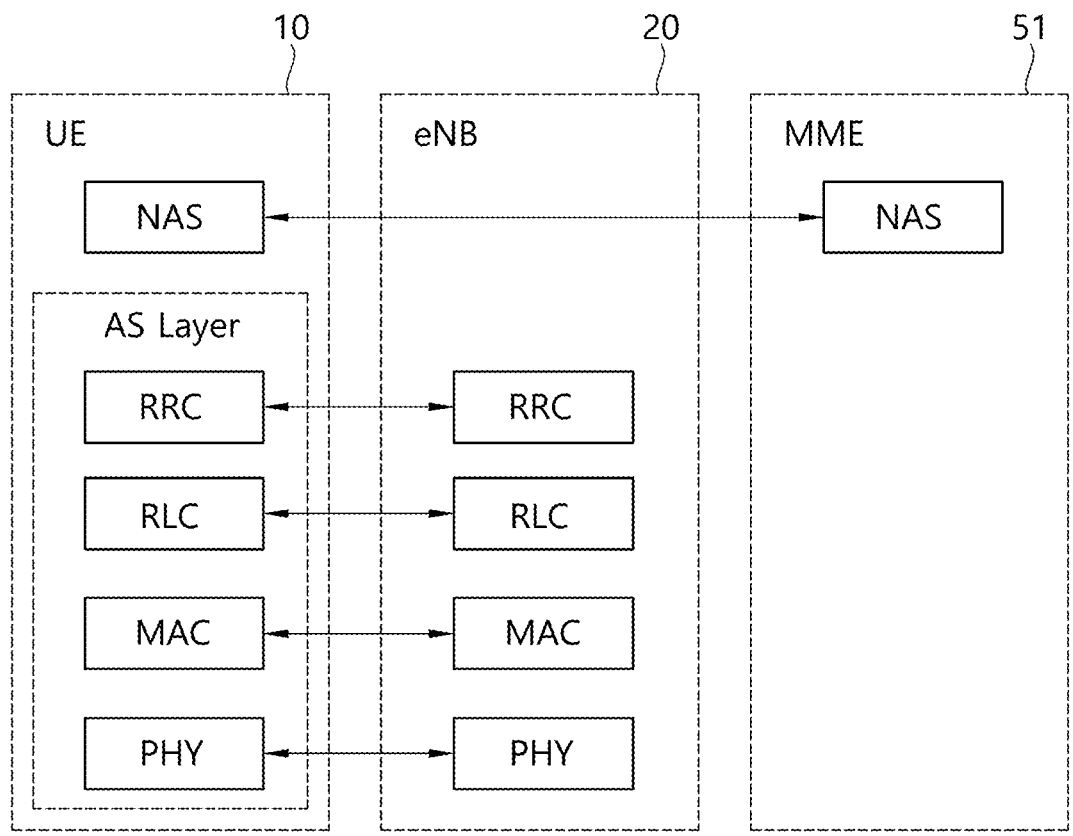
FIG. 3 is an exemplary diagram illustrating a structure of a radio interface protocol on a control plane between UE and eNodeB.
Figure 4:
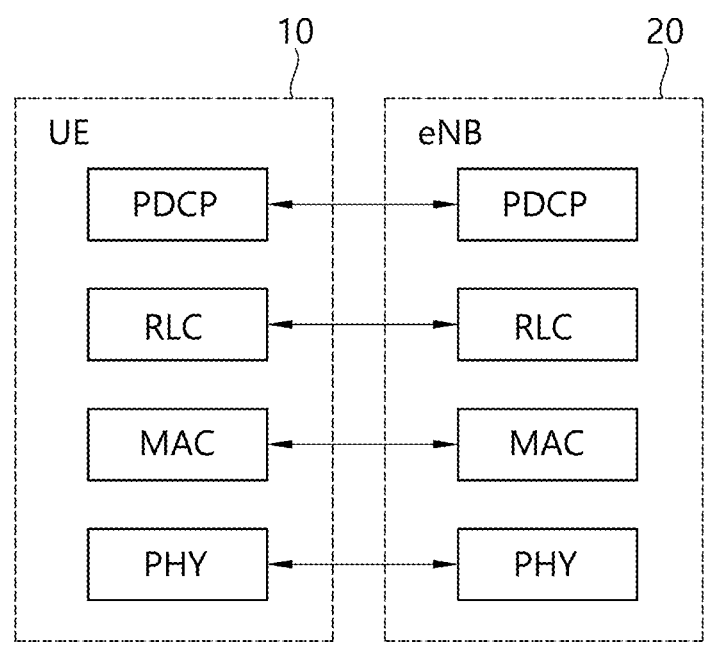
FIG. 4 is another exemplary diagram illustrating a structure of a radio interface protocol on a user plane between the UE and a base station.
Figure 5A:
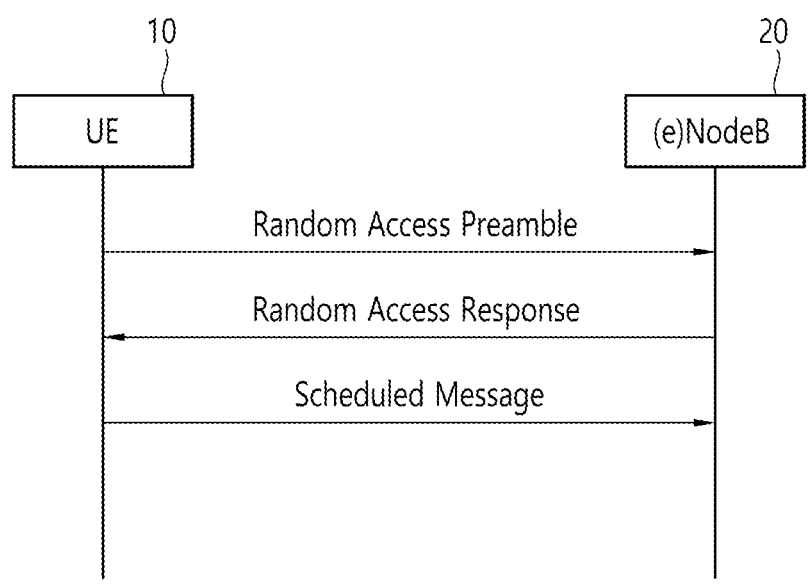
FIG. 5a is a flowchart illustrating a random access process in 3GPP LTE.
Figure 5B:
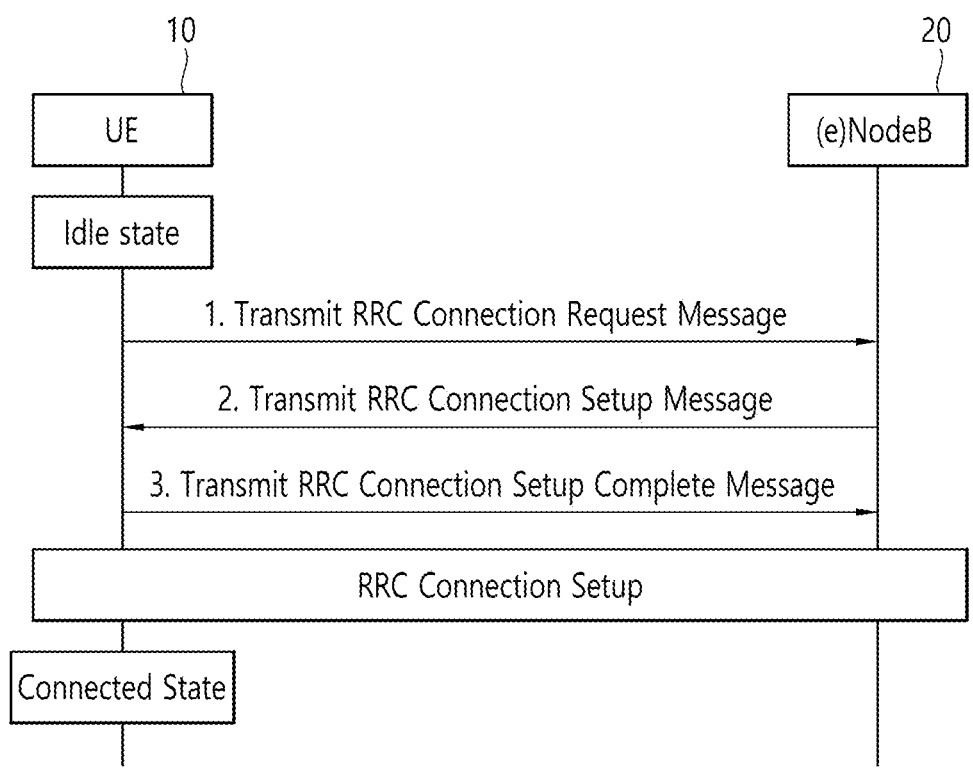
FIG. 5b illustrates a connection process in a radio resource control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art.

Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS.

PDN (Public Data Network): an independent network in which a service providing server is located.

PDN connection: connection from UE to PDN, i.e., association (connection) between a UE represented with an IP address and a PDN represented with an APN (access point name).

PDN-GW (Packet Data Network Gateway): a network node of an EPS network performing functions such as UE IP address allocation, packet screening & filtering, and charging data collection.

Serving GW (Serving Gateway): a network node of an EPS network performing functions such as mobility anchor, packet routing, idle mode packet buffering, and triggering MME to page UE.

A Policy and Charging Rule Function (PCRF): The node of an EPS network which performs a policy decision for dynamically applying QoS and a billing policy that are different for each service flow.

APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

A Tunnel Endpoint Identifier (TED): The end point ID of a tunnel set between nodes within a network, and it is set for each bearer unit of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB.

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority).

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

Mobility management (MM) operation/procedure: an operation or procedure for the mobility control/management/control of a UE. The MM operation/procedure may be construed as including one or more of an MM operation/procedure in a CS network, a GMM operation/procedure in a GPRS network, or an EMM operation/procedure in an EPS network. A UE and a network node (MME, SGSN, MSC) exchange MM messages in order to perform an MM operation/procedure.

Session management (SM) operation/procedure: an operation or procedure for controlling/managing/processing/handling the user plane and/or bearer context/PDP context of a UE. The SM operation/procedure may be construed as including one or more of an SM operation/procedure in a GPRS network or an ESM operation/procedure in an EPS network. A UE and a network node (MME, SGSN) exchange SM message in order to perform an SM operation/procedure.

Low priority UE: a UE set with NAS signal low priority. For detailed contents, reference may be made to the standard document 3GPP TS 24.301 and TS 24.008.

Normal priority UE: a normal UE not set with low priority

Dual priority UE: a UE set with dual priority. This UE is a UE set with NAS signal low priority and also configured to override the set NAS signal low priority (i.e., UE which provides dual priority support is set for NAS signalling low priority and also set to override the NAS signalling low priority indicator). For detailed contents, reference may be made to the standard document 3GPP TS 24.301 and TS 24.008.

PLMN: an abbreviation of a public land mobile network and means the network identification number of a provider. In the roaming situation of a UE, a PLMN is divided into a home PLMN (HPLMN) and a visited PLMN (VPLMN).

Proximity service (Proximity Service, ProSe Service or Proximity based Service): means discovery and mutually direct communication between physically adjacent UEs. However, the proximity service is a concept including communication between UEs through a base station and, furthermore, a concept including communication between UEs through a third UE. Here, data on a user plane is exchanged through a direct data path without passing through a 3GPP core network (e.g. EPC).

Proximity: That a UE is located in close proximity to another UE means when a predetermined proximity condition is met. A proximity condition for discovery may be different from a proximity condition for communication.

Range Class: means a rough distance range as a use for ProSe discovery, for example, a geographical distance range, and a distance range as a communication condition.

ProSe-enabled UE: means a UE supporting ProSe discovery, ProSe communication and/or ProSe-supported WLAN direct communication. In the present specification, the ProSe-enabled UE is also referred to as UE simply.

Announcing UE: a UE that notifies of information that can be used by adjacent UEs having discovery rights.

Monitoring UE: a UE that receives interested information from other adjacent UEs.

ProSe-enabled Network: means a network supporting ProSe discovery, ProSe communication and/or ProSe-supported WLAN direct communication. In the present specification, the ProSe-enabled Network is also referred to as network simply.

ProSe discovery: refers to a process of discovering a ProSe-enabled UE when it is closely located.

Open ProSe Discovery: means that it is possible to discover a ProSe-enabled UE without a direct permission when detecting it.

Restricted ProSe Discovery: means that it is possible to discover a ProSe-enabled UE only with a direct permission when detecting it.

ProSe Communication: means performing communication between UEs using an E-UTRAN communication path when a ProSe-enabled UE is closely located. A communication path may be established, for example, directly between UEs or via a local (or neighbor) eNodeB.

ProSe Group Communication: means performing one-to-all group communication using a common communication path established between two or more ProSe-enabled UEs when they are located adjacent to each other.

ProSe E-UTRA communication: means ProSe communication using an E-UTRA communication path.

ProSe-assisted WLAN direct communication: means ProSe communication using a WLAN direct communication path.

ProSe communication path: means a communication path supporting ProSe communication. A path of the ProSe E-UTRA communication can be established directly between ProSe-enabled UEs by using an E-UTRA or an eNodeB. A path of the ProSe-assisted WLAN direct communication can be established directly between the ProSe-enabled UEs via a WLAN.

EPC path (or infrastructure data path): mans a communication path of a user plane via EPC.

ProSe relay: may have two types as a UE capable of operating as a relay for ProSe.

ProSe UE-to-Network Relay: means playing a role of a communication repeater between a ProSe-enabled Network and a ProSe-enabled UE.

ProSe UE-to-UE Relay: means playing a role of a communication repeater between ProSe-enabled UEs.

Meanwhile, the embodiments of the present invention are described with reference to the drawings below.

<Introduction of Proximity Service (ProSe)>

Figure 8:
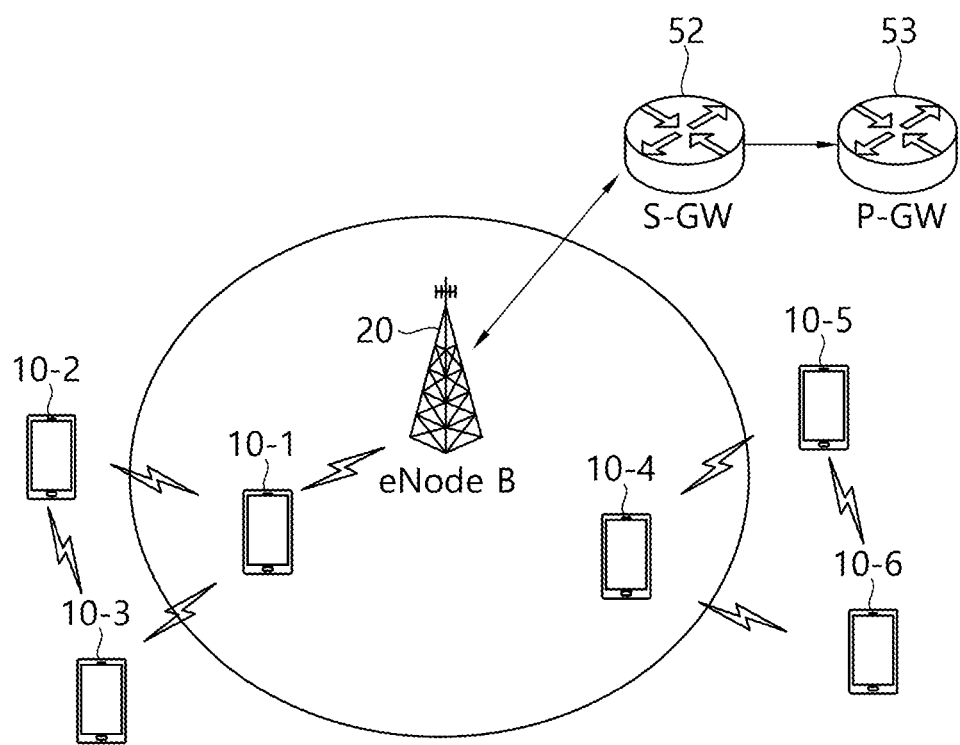
FIG. 8 shows the concept of proximity communication expected to be employed in a next-generation communication system.

FIG. 8 shows the concept of proximity communication expected to be employed in a next-generation communication system.

An increase in a user requirement for a social network service (SNS) results in the arising of a demand for a discovery between physically adjacent UEs and special applications/services, i.e., proximity-based application/services. Therefore, there is a growing increase in a demand for proximity communication between UEs.

Figure 6:
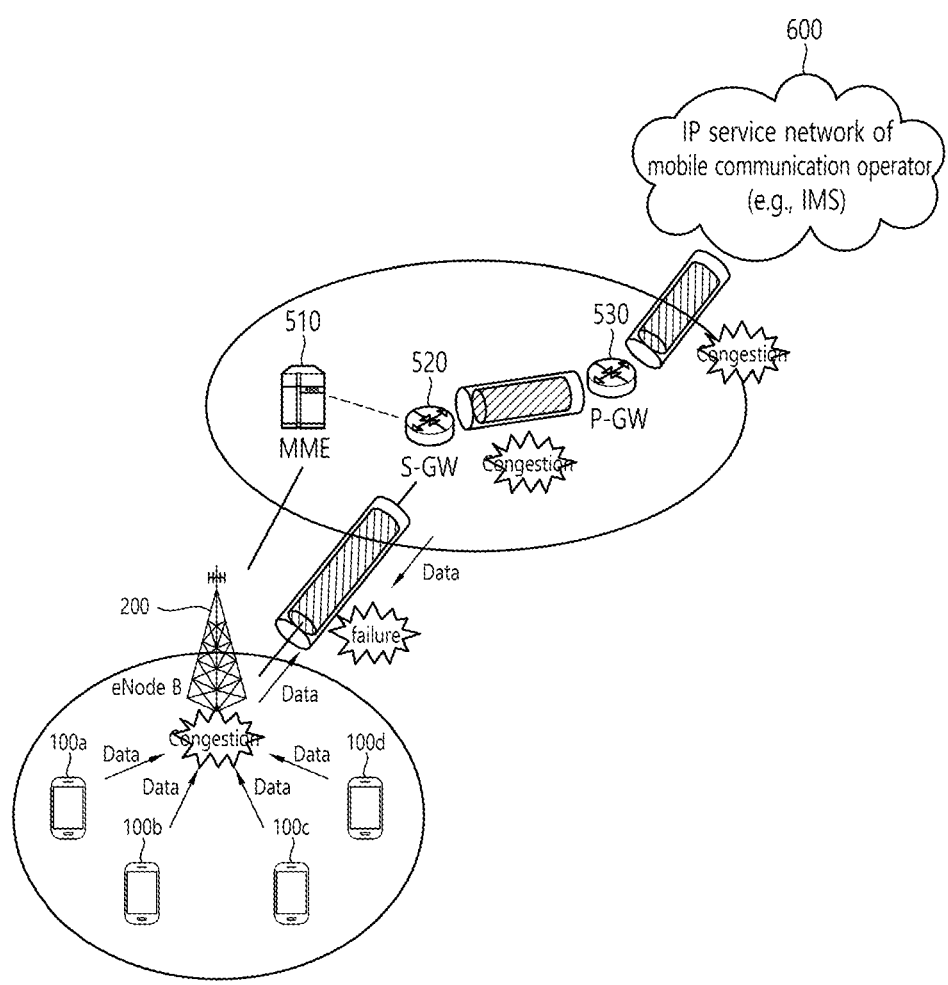
FIG. 6 shows the network overload condition.
Figure 7:
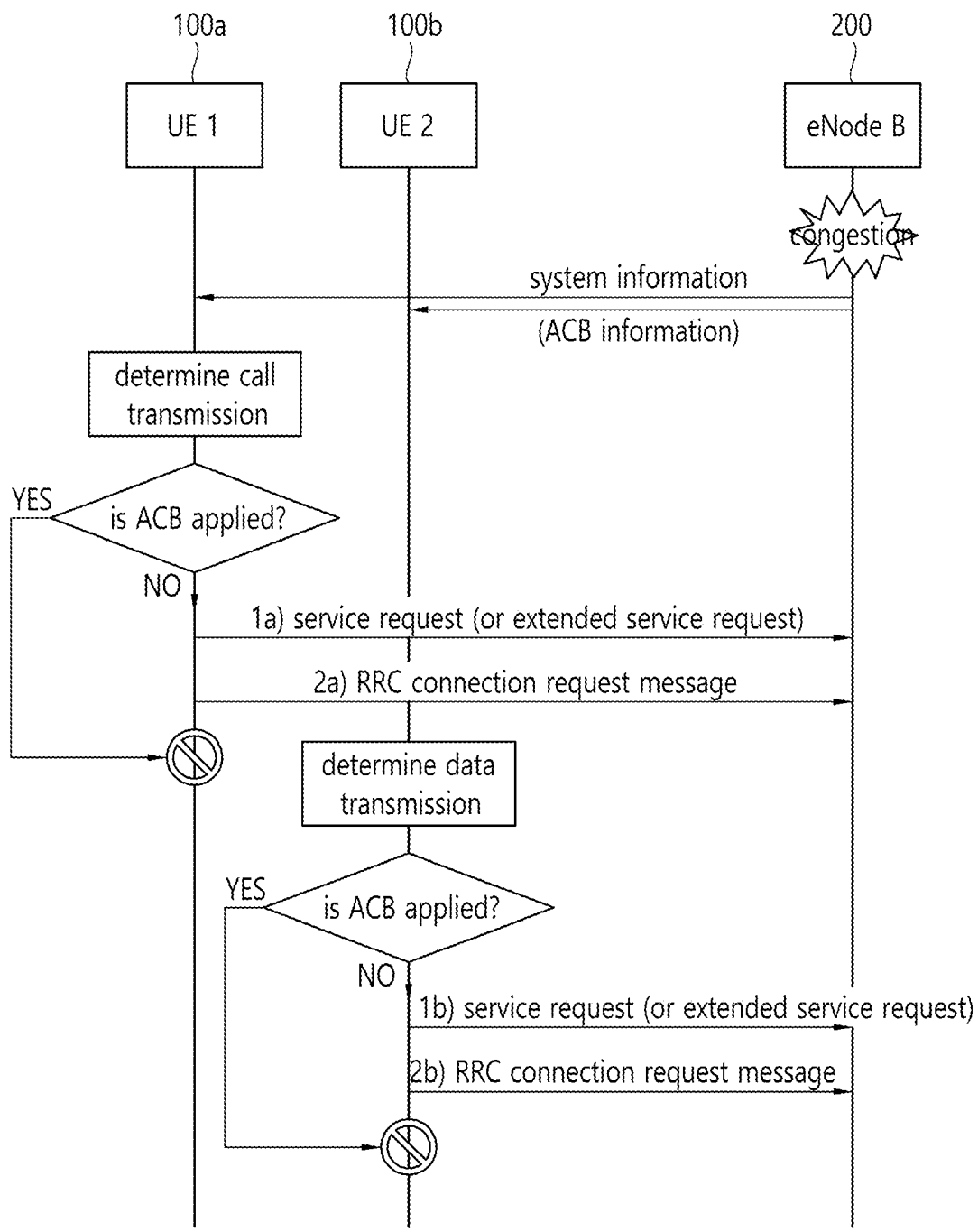
FIG. 7 is an exemplary flow chart illustrating the access blocking operation in the network congestion state.

In order to apply the aforementioned requirement, as illustrated in FIG. 6b, there is an ongoing discussion on a method capable of performing a directly communication among a UE #1 10-1, a UE #2 10-2, and a UE #3 10-3 or among a UE #4 10-4, a UE #5 10-5, and a UE #6 10-6 without an intervention of an eNodeB 20. Of course, communication may be achieved directly between the UE #1 10-1 and the UE #4 10-4 with the assistance of the eNodeB 20. Meanwhile, the UE #1 10-1 may play a role of a relay for the UE #2 10-2 and the UE #3 10-3 located far from a cell center. Likewise, the UE #4 10-4 may play a role of a relay for the UE #5 10-5 and the UE #6 10-6 located far from the cell center.

Meanwhile, the UE #1 10-1 may transmit a discovery signal to discover other UEs, for example, the UE #5 10-5 and the UE #6 10-6. Alternatively, in order to be discovered by other UEs, for example, the UE #5 10-5 and the UE #6 10-6), the UE #1 10-1 may transmit the discovery signal. However, since the discovery signal can be transmitted arbitrarily irrespective of whether the UE #1 10-1 is located within a specific region of interest, it causes inconvenience to a user of other UEs.

Figure 9A:
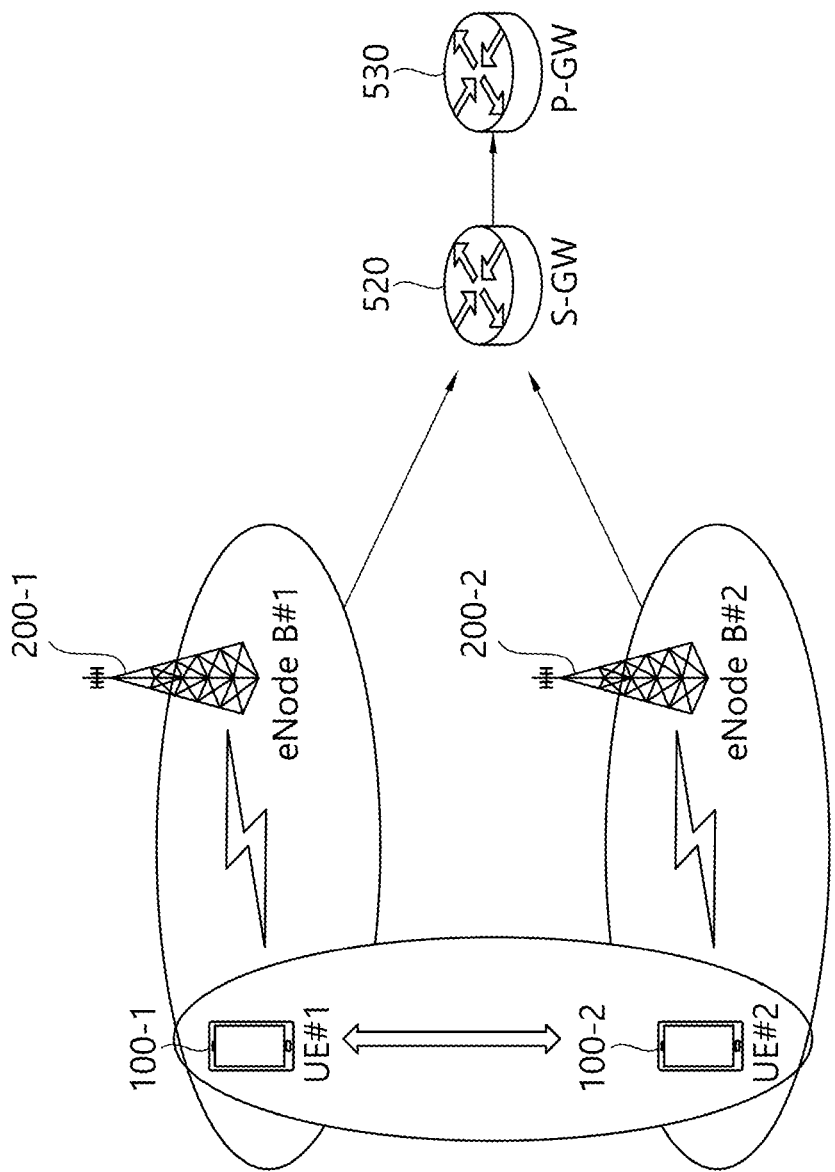
FIG. 9a is an exemplary diagram showing an example of proximity communication.
Figure 9B:
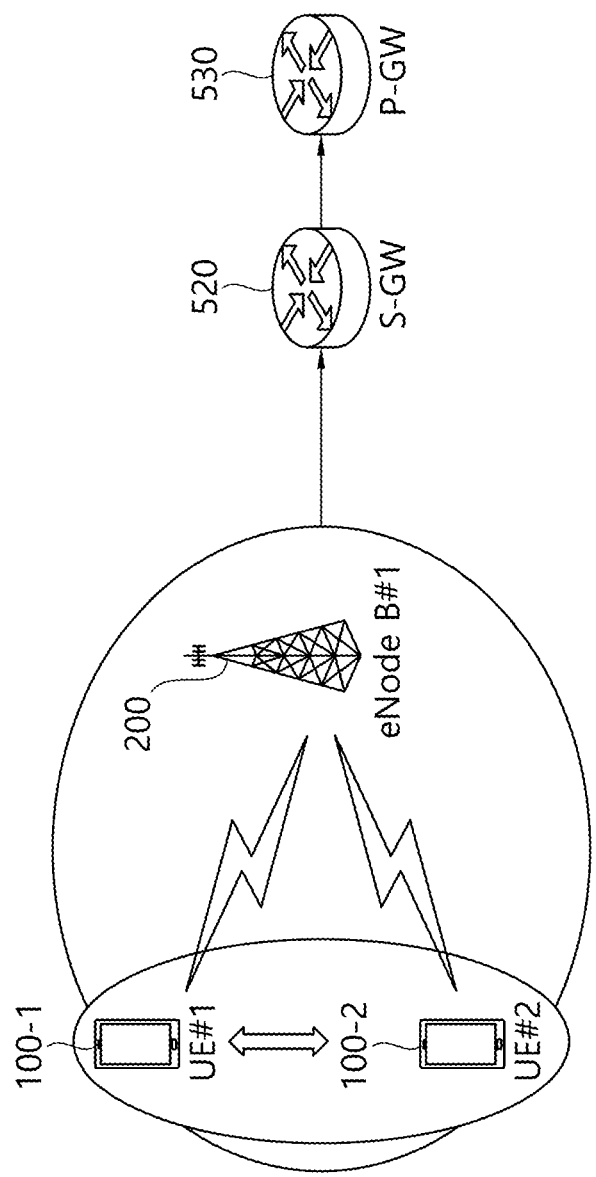
FIG. 9b is an exemplary diagram showing another example of proximity communication.

FIG. 9a is an exemplary diagram showing an example of proximity communication, and FIG. 9b is an exemplary diagram showing another example of proximity communication.

Referring to FIG. 9a, there is illustrated a situation that a UE #1 100-1 and a UE #2 100-2 perform proximity communication through a direct communication path while camping on different eNodeBs, respectively. Referring to FIG. 9b, there is shown a situation that a UE #1 100-1 and a UE #2 100-2 perform proximity communication through a direct communication path while camping on an eNodeB 200, respectively.

As such, the UE #1 100-1 and the UE #2 100-2 may perform proximity communication through a direct communication path bypassing a path through an eNodeB and a core network that a service provider operates.

The term, direct communication path, may be variously referred to as data path for proximity service, data path based on proximity service or proximity service communication path. Furthermore, communication through the direct communication path may be variously called direct communication, proximity service communication or proximity service-based communication.

Meanwhile, as an example of a proximity service, there may be a safety-related service. For example, although a user of a UE is in an emergency situation, if the user is located outside the coverage of an eNodeB, the user may deliver a rescue signal to other UEs through the proximity service to notify that the user is in the emergency situation. Alternatively, if the user of the UE is dispatched for an emergency rescue but is located outside the coverage of the eNodeB, the user may deliver the rescue signal to other UEs through the proximity service to notify the emergency situation to other emergency rescuers or to request for a rescue.

A social network service (SNS) may be one example of another proximity service. The SNS causes data transmission very often, which may result in an increase in a load of the eNodeB. Therefore, the proximity service is directly performed between UEs without an intervention of the eNodeB, thereby decreasing the load of the eNodeB.

A group communication service may be utilized as one example of another proximity service. Alternatively, a service such as Push-To-Talk (PTT) may be taken as one example of the group communication service. Taking the PTT service for example, one UE may transmit media (e.g., voice or the like) as a talking partner, and a plurality of other UEs may receive the media of the talking party UE. In this case, several UEs cannot transmit the media simultaneously as the talking partner.

<Problem Occurred when an Access Control is Performed in a Proximity Service>

As described above, a remote UE may receive a network connectivity service through a relay UE. However, in the case that the access control is applied owing to a network congestion, the remote UE may not establish an RRC connection or may not use a specific service and/or application. Particularly, this will be described with reference to FIG. 10.

Figure 10:
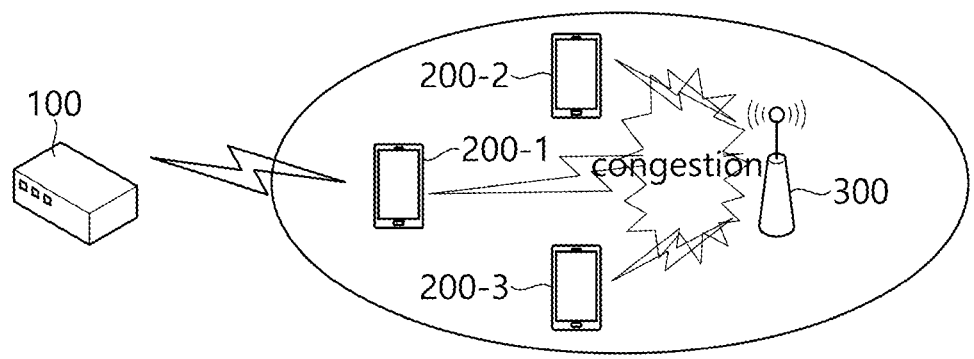
FIG. 10 is a diagram illustrating a problem that may occur when an access control is performed in a proximity service.

FIG. 10 is a diagram illustrating a problem that may occur when an access control is performed in a proximity service.

Referring to FIG. 10, a remote UE 100 may request a network connectivity service through a relay UE 200-1 to connect to an eNB 300. However, in the case that a plurality of relay UEs 200-1, 200-2 and 200-3 is connected to a specific eNB 300 and a network congestion situation occurs, an access control may be applied, and in this case, the remote UE 100 is difficulty in accessing to the eNB 300 smoothly.

That is, the remote UE 100 may be unable to establish an RRC connection or may be unable to use a specific service and/or application that the remote UE 100 is intended to use.

As shown in FIG. 10, even in the case that the network congestion occurs, the remote UE 100 may request the network connectivity service, not knowing the network congestion situation. Owing to this, there is a problem that a resource is wasted, a battery is consumed and delay in a service connectivity is caused.

In addition, currently, in 3GPP, in network congestion, there is problem that it is unclear which is a subject of performing the access control. That is, as shown in FIG. 10, in the case that network congestion situation occurs, there is problem that it is unclear whether a control is performed by a remote UE 100 or a relay UE 200-1.

<Disclosure Of The Present Specification>

Accordingly, the present specification proposes a method for a remote UE (Evolved ProSe Remote UE) to perform an access control efficiently when transmitting data in 3GPP Relay network (Evolved ProSe UE-to-Network Relay).

I. Proposal 1: Discovery Model A

FIG. 11 illustrates a method for a remote UE to select a relay UE for trying a connection in Discovery model A.

Referring to FIG. 11, in Discovery model A, a relay UE may transmit a message informing that the relay UE itself is a relay UE (e.g., PC5 announcement message) periodically (step, S1110). In the case that an access control is applied owing to a network congestion (step, S1120), the relay UE may transmit a message including information for the access control to a remote UE (step, S1130). According to an embodiment, the information for the access control may be PC5 announcement message or a new message. According to an embodiment, the relay UE may use one of PC5-Signalling, PC5-Discovery, PC5-U and PPC connection establishment when transmitting the information for the access control.

The contents included in the information for the access control may be different according to an embodiment. That is, the information for the access control may be different with each other according to a subject that performs the access control. Hereinafter, the contents included in the information for the access control is described according to a subject that performs the access control.

(1) The case that the access control is performed by a remote UE

1) Access class information of a relay UE

2) Parameter information related to access control mechanism provided through SIB2, SIB4 or new SIB in a current serving cell (e.g., ACB, SSAC, ACB skip, EAB and ACDC)

Here, the parameter information related to access control mechanism may include ACB barring parameters (e.g., barring rate, barring time), SSAC barring parameters for MMTEL voice and/or MINITEL video, ACB skip parameters for MINITEL voice and/or MINITEL video, SMS over IP and SMS (over NAS), ACDC parameters (e.g., barring rate, barring time for ACDC category), CSFB, Emergency and Barring parameters for High priority.

3) Access control mechanism information set to a relay UE (EAB, overriding EAB, ACDC)

4) Configuration information set to a relay UE (e.g., NAS signaling low priority, overriding NAS signaling low priority (=dual priority))

5) Information for start and/or end of access control

Here, the information for start of access control may be information (or indicator) that explicitly means a start of the access control or without information that explicitly means a start and may be regard as start the access control when receiving the sections 1) to 4) from the relay UE. In addition, the information for end of access control may be information (or indicator) that explicitly means an end of the access control or without information that explicitly means a start or may be regard as an end of the access control when receiving the sections 1) to 4) from the relay UE.

6) Information on whether a relay UE is in a connected mode or an idle mode (i.e., information representing whether the relay UE is in a connected mode or an idle mode currently, or information representing whether a switching to a connected mode is started)

In the case that the remote UE fails to receive the information for the connected mode from the relay UE, the relay UE may be regarded as that of in an idle mode. In addition, on the contrary, in the case that the remote UE fails to receive the information for the idle mode from the relay UE, the relay UE may be regarded as that of in a connected mode.

7) Relay service code of a relay UE

The relay service code may be information which is preconfigured from a network.

8) User information identifier (User Info ID) of a relay UE

The relay service code may be information which is preconfigured from a network.

(2) The case that the access control is performed by a relay UE

1) Access class information of a relay UE

2) Access control mechanism information set to a relay UE (EAB, overriding EAB, ACDC)

3) Configuration information set to a relay UE (e.g., NAS signaling low priority, overriding NAS signaling low priority (=dual priority))

4) Information for start and/or end of access control

Here, the information for start of access control may be information (or indicator) that explicitly means a start of the access control or without information that explicitly means a start, may be regard as start the access control when receiving the sections 1) to 4) from the relay UE. In addition, the information for end of access control may be information (or indicator) that explicitly means an end of the access control or without information that explicitly means a start, may be regard as end the access control when receiving the sections 1) to 4) from the relay UE.

5) Information on whether a relay UE is in a connected mode or an idle mode (i.e., information representing whether the relay UE is in a connected mode or an idle mode currently, or information representing whether a switching to a connected mode is started)

In the case that the remote UE fails to receive the information for the connected mode from the relay UE, the relay UE may be regarded as that of in an idle mode. In addition, on the contrary, in the case that the remote UE fails to receive the information for the idle mode from the relay UE, the relay UE may be regarded as that of in a connected mode.

6) Relay service code of a relay UE: The relay service code may be information which is preconfigured from a network.

7) User information identifier (User Info ID) of a relay UE: The relay service code may be information which is preconfigured from a network.

In the case that the access control is performed by the relay UE, the relay UE may receive the parameter information related to the access control mechanism through SIB (or dedicated channel) from a serving network. According to an embodiment, the relay UE may receive the parameter information related to the access control mechanism periodically or on-demand manner. The parameter information related to the access control mechanism may include parameter information related to the access control mechanism provided through SIB2, SIB4 or new SIB in a current serving cell (e.g., ACB, SSAC, ACB skip, EAB and ACDC). The parameter information related to the access control mechanism may include ACB barring parameters (e.g., barring rate, barring time), SSAC barring parameters for MINITEL voice and/or MINITEL video, ACB skip parameters for MINITEL voice and/or MINITEL video, SMS over IP and SMS (over NAS), ACDC parameters (e.g., barring rate, barring time for ACDC category), CSFB, Emergency and Barring parameters for High priority.

The information related to the access control may be provided to a plurality of UEs through a dedicated channel, provided to a specific UE or broadcasted to all UEs. The information related to the access control may be provided periodically or on-demand scheme (i.e., in the case that there is a request for the information related to the access control, a remote UE may provide the information related to the access control).

According to an embodiment, in the case that the remote UE discovers a relay UE that starts the access control, the remote UE may not try a connection to the relay UE that starts the access control but try a connection to another relay UE that does not perform the access control.

The remote UE may obtain access class information, parameter information related to the access control mechanism, configuration information set to the relay UE from the relay UE through sections 1) to 4).

According to an embodiment, the information that the remote UE received from the relay UE through sections 1) to 4) may not identical to the information owned by the remote UE. For example, the access class of the remote UE may be '7', but the obtained access class of the relay UE may be '3'. In addition, the remote UE may be configured for EAB and/or ACDC, but the received information related to the access control may be not configured for EAB and/or ACDC. Furthermore, the remote UE may be configured for NAS signaling low priority and/or overriding NAS signaling low priority, but the received information related to the access control may be not configured for NAS signaling low priority and/or overriding NAS signaling low priority.

As such, in the case that the information related to the access control is not matched to the information owned by the remote UE, the remote UE may select a relay UE to try a connection through the following operation (step, S1140), and the remote UE may try a connection to the selected relay UE to access a network through the selected relay UE (step, S1150).

(1) In the case that the information owned by the remote UE is partially identical to the information related to the access control received from the relay UE, the remote UE may select a relay UE based on a priority. For example, according to an embodiment, the priority may be as below.

1) First, a connection is tried by selecting a relay UE that transmits the same access class as the access class of the remote UE.

2) Second, in the case that step 1) is failed, a connection is tried by selecting a relay UE that transmits the same configuration information as the configuration information of the remote UE (particularly, NAS signaling low priority, overriding NAS signaling low priority).

3) Third, both step 1) and step 2) are failed, a connection is tried by selecting a relay UE that transmits the same EAB related information as the EAB related information (particularly, EAB and overriding EAB) among the access control mechanism information of the remote UE.

4) Fourth, step 1) to step 3) are failed, a connection is tried by selecting a relay UE that transmits the same ACDC related information as the ACDC related information among the access control mechanism information of the remote UE.

(2) The priority may be determined based on separate configuration information provided by a network (eNB, MME/SGSN or service provider network). The priority may be transmitted through OMA-DM, USIM, SIB or a dedicated channel.

(3) In the case that there is no relay UE that transmits the same information as its own access class information, the currently set access control mechanism information and the currently set configuration information during the discovery procedure for finding a relay UE to connect, the remote UE may disregard it and try to a connection by selecting any one of the relay UEs that transmit other information.

(4) It may be determined based on separate configuration information provided by a network (eNB, MME/SGSN or service provider network) on which method is used for selecting a relay UE among the relay UE selection methods of (1) to (3). The network may transmit the separate configuration information determined through OMA-DM, USIM, SIB or a dedicated channel to the remote UE. The determined separate configuration information may be one of the relay UE selection methods of (1) to (3) or that of two or more relay UE selection methods being combined.

In addition, in the case that there is no relay UE that transmits the access class information of the remote UE, the access class information identical to the currently set access control mechanism information and the currently set configuration information, and the access control mechanism information and the configuration information, the remote UE may select a relay UE to connect based on Direct Discovery for Public Safety operation.

The Direct Discovery for Public Safety is referred to the contents of Direct Discovery for Public Safety described in clause 4.5.1.1.2.3.2 and clause 4.5.1.1.2.3.4 of 3GPP TS 23.303 (2017-06). The additional information not directly used in the discovery may be published as a single or individual announcement message of "Relay Discovery Additional Information" type using PC-5D protocol stack such as relayed TMGI and ECGI of a serving cell.

That is, the remote UE may find a relay UE that provides a relay service code and user information identifier information identical to its own Relay Service Code and user information identifier (User Info ID) which are preconfigured and try a connection. According to an embodiment, the connection try may be performed prior to the relay UE selection methods of (1) to (3) and may also be performed after the relay UE selection methods of (1) to (3) are performed.

According to an embodiment, the connection try may be performed independently to the relay UE selection methods of (1) to (3). That is, according to an embodiment, the remote UE may find a relay UE that provides a relay service code and user information identifier information identical to its own Relay Service Code and user information identifier which are preconfigured and try a connection independently to whether to perform the relay UE selection methods of (1) to (3).

In addition, according to an embodiment, in the process of performing the relay UE selection methods of (1) to (4), in the case that there is a plurality of relay UEs to which the remote UE is trying to connect, the remote UE may try a connection by selecting a relay UE of which signal strength is strong or selecting a relay UE by a configuration/policy of a network (e.g., eNB, MME/SGSN or service provider network).

II. Proposal 2: Discovery Model B

Figure 12A:
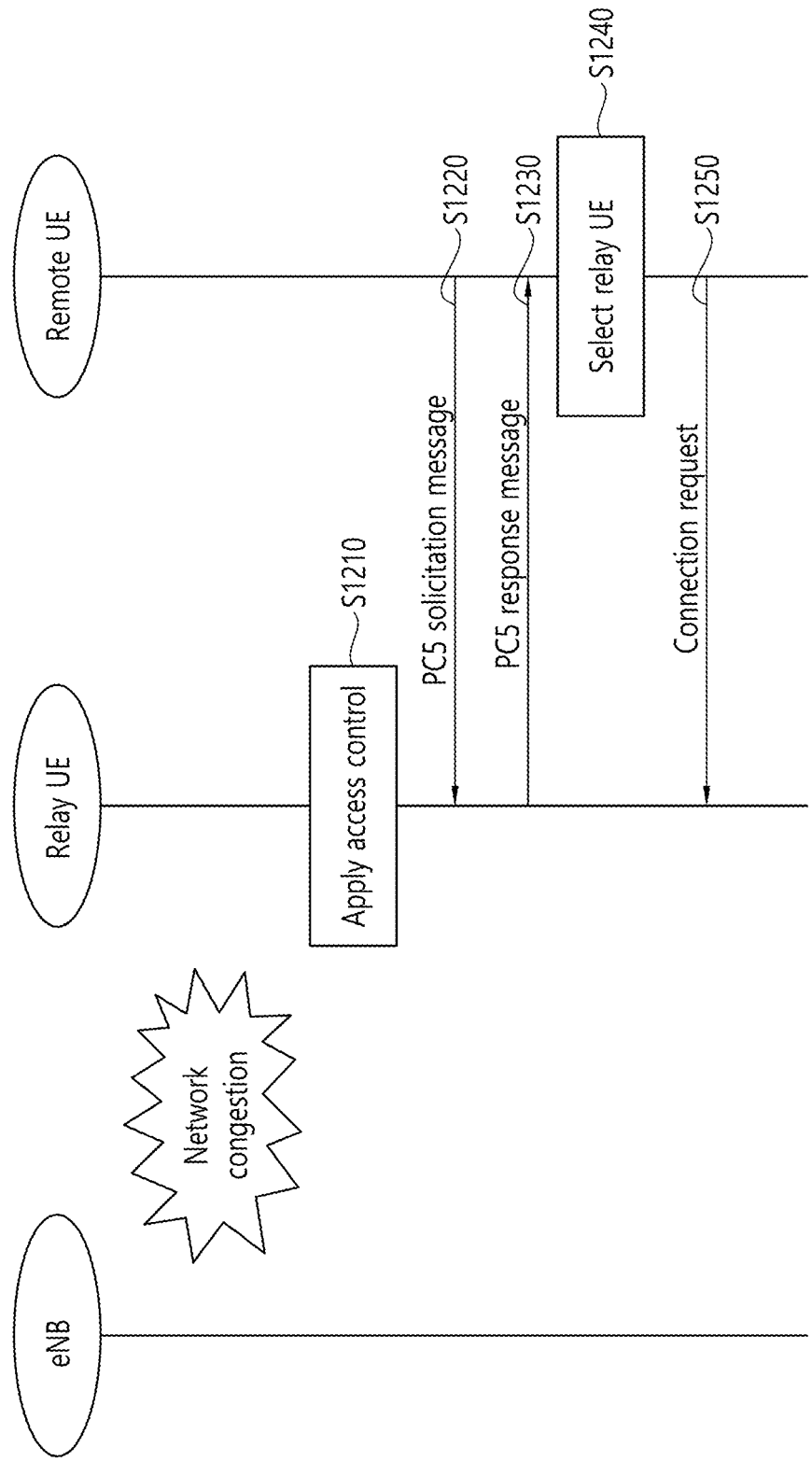
FIG. 12a illustrates a method for a remote UE to select a relay UE for trying a connection in Discovery model B.

FIG. 12a illustrates a method for a remote UE to select a relay UE for trying a connection in Discovery model B.

Referring to FIG. 12a, in Discovery model B, a remote UE may transmit an announcement message for finding a relay UE. The announcement message may be PC5 solicitation message.

When a relay UE is applying an access control (step, S1210), in the case that the relay UE receives the announcement message from a remote UE that discovers the relay UE for receiving a network connectivity service, one of the relay UE selection methods may be performed, which will be described below.

That is, in a network congestion situation, when a relay UE which is applying an access control receives the announcement message (e.g., PC5 solicitation message) from a remote UE that discovers the relay UE for receiving a network connectivity service (step, S1220), the relay UE may transmit a discovery response message to the remote UE in response to the announcement message (step, S1230). The discovery response message may be PC5 response message or a new response message. According to an embodiment, the relay UE may use one of PC5-Signalling, PC5-Discovery, PC5-U and PPC connection establishment when transmitting the discovery response message.

The discovery response message may include at least one of the following information.

1) Access class information of a relay UE

2) Parameter information related to access control mechanism provided through SIB2, SIB4 or new SIB in a current serving cell (e.g., ACB, SSAC, ACB skip, EAB and ACDC)

Here, the parameter information related to access control mechanism may include ACB barring parameters (e.g., barring rate, barring time), SSAC barring parameters for MMTEL voice and/or MMTEL video, ACB skip parameters for MINITEL voice and/or MMTEL video, SMS over IP and SMS (over NAS), ACDC parameters (e.g., barring rate, barring time for ACDC category), CSFB, Emergency and Barring parameters for High priority.

3) Access control mechanism information set to a relay UE (EAB, overriding EAB, ACDC)

4) Configuration information set to a relay UE (e.g., NAS signaling low priority, overriding NAS signaling low priority (=dual priority))

5) Information for start and/or end of access control

Here, the information for start of access control may be information (or indicator) that explicitly means a start of the access control or without information that explicitly means a start, may be regard as start the access control when receiving the sections 1) to 4) from the relay UE. In addition, the information for end of access control may be information (or indicator) that explicitly means an end of the access control or without information that explicitly means a start, may be regard as end the access control when receiving the sections 1) to 4) from the relay UE.

6) Information on whether a relay UE is in a connected mode or an idle mode (i.e., information representing whether the relay UE is in a connected mode or an idle mode currently, or information representing whether a switching to a connected mode is started)

In the case that the remote UE fails to receive the information for the connected mode from the relay UE, the relay UE may be regarded as that of in an idle mode. In addition, on the contrary, in the case that the remote UE fails to receive the information for the idle mode from the relay UE, the relay UE may be regarded as that of in a connected mode.

7) Relay service code of a relay UE

The relay service code may be information which is preconfigured from a network.

8) User information identifier (User Info ID) of a relay UE

The relay service code may be information which is preconfigured from a network.

The discovery response message may be provided to a plurality of UEs through a dedicated channel, provided to a specific UE or broadcasted to all UEs. The discovery response message may be provided periodically or on-demand scheme (i.e., in the case that there is a request for the information related to the access control, a remote UE may provide the information related to the access control).

According to an embodiment, in the case that the remote UE discovers a relay UE that starts the access control, the remote UE may not try a connection to the relay UE that starts the access control but try a connection to another relay UE that does not perform the access control.

The remote UE may obtain access class information, parameter information related to the access control mechanism, configuration information set to the relay UE from the relay UE through sections 1) to 4).

According to an embodiment, the information that the remote UE received from the relay UE through sections 1) to 4) may not identical to the information owned by the remote UE. For example, the access class of the remote UE may be '7', but the obtained access class of the relay UE may be '3'. In addition, the remote UE may be configured for EAB and/or ACDC, but the received information related to the access control may be not configured for EAB and/or ACDC. Furthermore, the remote UE may be configured for NAS signaling low priority and/or overriding NAS signaling low priority, but the received information related to the access control may be not configured for NAS signaling low priority and/or overriding NAS signaling low priority.

As such, in the case that the information related to the access control is not matched to the information owned by the remote UE, the remote UE may select a relay UE to try a connection through the following operation (step, S1240), and the remote UE may try a connection to the selected relay UE to access a network through the selected relay UE (step, S1250).

(1) In the case that the information owned by the remote UE is partially identical to the discovery response message received from the relay UE, the remote UE may select a relay UE based on a priority. For example, according to an embodiment, the priority may be as below.

1) First, a connection is tried by selecting a relay UE that transmits the same access class as the access class of the remote UE.

2) Second, in the case that step 1) is failed, a connection is tried by selecting a relay UE that transmits the same configuration information as the configuration information of the remote UE (particularly, NAS signaling low priority, overriding NAS signaling low priority).

3) Third, both step 1) and step 2) are failed, a connection is tried by selecting a relay UE that transmits the same EAB related information as the EAB related information (particularly, EAB and overriding EAB) among the access control mechanism information of the remote UE.

4) Fourth, step 1) to step 3) are failed, a connection is tried by selecting a relay UE that transmits the same ACDC related information as the ACDC related information among the access control mechanism information of the remote UE.

(2) The priority may be determined based on separate configuration information provided by a network (eNB, MME/SGSN or service provider network). The priority may be transmitted through OMA-DM, USIM, SIB or a dedicated channel.

(3) In the case that there is no relay UE that transmits the same information as its own access class information, the currently set access control mechanism information and the currently set configuration information during the discovery procedure for finding a relay UE to connect, the remote UE may try to a connection by selecting any one of the relay UEs that transmit non-identical information.

(4) It may be determined based on separate configuration information provided by a network (eNB, MME/SGSN or service provider network) on which method is used for selecting a relay UE among the relay UE selection methods of (1) to (3). The network may transmit the separate configuration information determined through OMA-DM, USIM, SIB or a dedicated channel to the remote UE. The determined separate configuration information may be one of the relay UE selection methods of (1) to (3) or that of two or more relay UE selection methods being combined.

In addition, in the case that there is no relay UE that transmits the access class information of the remote UE, the access class information identical to the currently set access control mechanism information and the currently set configuration information, and the access control mechanism information and the configuration information, the remote UE may select a relay UE to connect based on Direct Discovery for Public Safety operation.

The Direct Discovery for Public Safety is referred to the contents of Direct Discovery for Public Safety described in clause 4.5.1.1.2.3.2 and clause 4.5.1.1.2.3.4 of 3GPP TS 23.303 (2017-06). The additional information not directly used in the discovery may be published as a single or individual announcement message of "Relay Discovery Additional Information" type using PC-5D protocol stack such as relayed TMGI and ECGI of a serving cell.

That is, the remote UE may find a relay UE that provides a relay service code and user information identifier information identical to its own Relay Service Code and user information identifier (User Info ID) which are preconfigured and try a connection. According to an embodiment, the connection try may be performed prior to the relay UE selection methods of (1) to (3) and may also be performed after the relay UE selection methods of (1) to (3) are performed.

According to an embodiment, the connection try may be performed independently to the relay UE selection methods of (1) to (3). That is, according to an embodiment, the remote UE may find a relay UE that provides a relay service code and user information identifier information identical to its own Relay Service Code and user information identifier which are preconfigured and try a connection independently to whether to perform the relay UE selection methods of (1) to (3).

In addition, according to an embodiment, in the process of performing the relay UE selection methods of (1) to (4), in the case that there is a plurality of relay UEs to which the remote UE is trying to connect, the remote UE may try a connection by selecting a relay UE of which signal strength is strong or selecting a relay UE by a configuration/policy of a network (e.g., eNB, MME/SGSN or service provider network).

FIG. 12b illustrates a method for a relay UE to select a remote UE to transmit a response message in Discovery model B.

Referring to FIG. 12b, in Discovery model B, a relay UE may receive an announcement message for finding a relay UE from a remote UE (step, S1260). The announcement message may be PC5 solicitation message.

The announcement message may include at least one of the following information.

i) Access class information of a relay UE
ii) Access control mechanism information set to a remote UE (EAB, overriding EAB, ACDC)
iii) Configuration information set to a remote UE (e.g., NAS signaling low priority, overriding NAS signaling low priority (=dual priority))
iv) Relay service code of a remote UE The relay service code may be information which is preconfigured from a network.

v) User information identifier (User Info ID) of a remote UE

The relay service code may be information which is preconfigured from a network.

The announcement message may be provided to a plurality of UEs through a dedicated channel, provided to a specific UE or broadcasted to all UEs. The discovery response message may be provided periodically or on-demand scheme (i.e., in the case that there is a request for the information related to the access control, a remote UE may provide the information related to the access control).

When a relay UE that receives the announcement message from a remote UE that discovers the relay UE is applying an access control in a network congestion situation (step, S1270), the relay UE may select a remote UE to transmit a discovery response message based on the received announcement message (step, S1275). The relay UE may transmit a discovery response message to the remote UE based on the announcement message (step, S1280). The discovery response message may be PC5 response message or a new response message. According to an embodiment, the relay UE may use one of PC5-Signalling, PC5-Discovery, PC5-U and PPC connection establishment when transmitting the discovery response message. The remote UE that receives the discovery response message may try a connection to the relay UE that transmits the discovery response message (step, S1290).

The relay UE may perform one of the following methods to select a remote UE to transmit a response message.

(1) The relay UE may receive the access class information of the remote UE, the access control mechanism information set to the remote UE and the configuration information set to the remote UE through i) to iii) and transmit the discovery response message to the remote UE that transmits the same information as its own access class information, access control mechanism information and the configuration information.

(2) In the case that there is no remote UE that transmits the same information as the access class information, the access control mechanism information and the configuration information of the relay UE (i.e., the relay UE fails to find the remote UE that transmits the same information as its own the access class information, the access control mechanism information and the configuration information), the relay UE may transmit a discovery response message to the remote UE that transmits information partially identical to the access class information, the access control mechanism information and the configuration information. At this time, the relay UE may select a remote UE to transmit a discovery response message based on a priority, and the priority may be as below.

1) First, a discovery response message may be transmitted by selecting a relay UE that transmits the same access class as the access class of the remote UE.

2) Second, in the case that step 1) is failed, a discovery response message may be transmitted by selecting a relay UE that transmits the same configuration information as the configuration information of the remote UE (particularly, NAS signaling low priority, overriding NAS signaling low priority).

3) Third, both step 1) and step 2) are failed, a discovery response message may be transmitted by selecting a relay UE that transmits the same EAB related information as the EAB related information (particularly, EAB and overriding EAB) among the access control mechanism information of the remote UE.

4) Fourth, step 1) to step 3) are failed, a discovery response message may be transmitted by selecting a relay UE that transmits the same ACDC related information (particularly, ACDC configuration and/or ACDC category) as the ACDC related information among the access control mechanism information of the remote UE.

According to an embodiment, the priority may be determined based on separate configuration information provided by a network (eNB, MME/SGSN or service provider network). The priority may be transmitted through OMA-DM, USIM, SIB or a dedicated channel.

(3) In the case that there is no relay UE that transmits the same information as its own access class information, the currently set access control mechanism information and the currently set configuration information during the discovery procedure, the remote UE may try to a connection by selecting any one of the relay UEs that transmit non-identical information.

(4) The remote UE selection methods of (1) to (3) described above may be performed based on separate configuration information provided by a network (eNB, MME/SGSN or service provider network). The network may transmit the separate configuration information determined through OMA-DM, USIM, SIB or a dedicated channel to the remote UE. The determined separate configuration information may be one of the relay UE selection methods of (1) to (3) or that of two or more remote UE selection methods being combined.

In addition, in the case that the relay UE fails to find the remote UE that transmits the access class information of the remote UE, the access class information identical to the currently set access control mechanism information and the currently set configuration information, and the access control mechanism information and the configuration information, the relay UE may select a relay UE to connect based on Direct Discovery for Public Safety operation.

The Direct Discovery for Public Safety is referred to the contents of Direct Discovery for Public Safety described in clause 4.5.1.1.2.3.2 and clause 4.5.1.1.2.3.4 of 3GPP TS 23.303 (2017-06). The additional information not directly used in the discovery may be published as a single or individual announcement message of "Relay Discovery Additional Information" type using PC-5D protocol stack such as relayed TMGI and ECGI of a serving cell.

That is, the relay UE may find a relay UE that provides a relay service code and user information identifier information identical to its own Relay Service Code and user information identifier (User Info ID) which are preconfigured and try a connection. According to an embodiment, the connection try may be performed prior to the relay UE selection methods of (1) to (3) and may also be performed after the relay UE selection methods of (1) to (3) are performed.

According to an embodiment, the operation may be performed independently to the remote UE selection methods of (1) to (3). That is, according to an embodiment, the relay UE may find a remote UE that provides a relay service code and user information identifier information identical to its own Relay Service Code and user information identifier which are preconfigured and try a connection independently to whether to perform the relay UE selection methods of (1) to (3).

In addition, according to an embodiment, in the process of performing the remote UE selection methods of (1) to (4), in the case that there is a plurality of remote UEs that the relay UE finds, the relay UE may transmit a discovery response message to the remote UE which is selected by a configuration/policy of a network (e.g., eNB, MME/SGSN or service provider network).

In the case that the relay UE that receives the announcement message (e.g., PC5 solicitation message) from the remote UE applies the access control in a network congestion situation, the announcement message (e.g., PC5 solicitation message) may further include the following information.

vi) Information for start and/or end of access control

Here, the information for start of access control may be information (or indicator) that explicitly means a start of the access control or without information that explicitly means a start and may be regard as start the access control by autonomous determination of the remote UE without information meaning an explicit start. In addition, the information for end of access control may be information (or indicator) that explicitly means an end of the access control or without information that explicitly means a start or may be regard as an end of the access control by autonomous determination of the remote UE without information meaning an explicit end.

vii) Information on whether a relay UE is in a connected mode or an idle mode (i.e., information representing whether the relay UE is in a connected mode or an idle mode currently, or information representing whether a switching to a connected mode is started)

In the case that the remote UE fails to receive the information for the connected mode from the relay UE, the relay UE may be regarded as that of in an idle mode. In addition, on the contrary, in the case that the remote UE fails to receive the information for the idle mode from the relay UE, the relay UE may be regarded as that of in a connected mode.

III. Access Control Applicability

1) The case that an access control is performed by a remote UE

Without regard to the relay UE selection according to the model A discovery described in FIG. 11 and the model B discovery described in FIG. 12*a,* a remote UE identify the access control performed by a relay UE.

According to an embodiment, in the case that a relay UE applies the access control in a network congestion situation, a specific message may be transmitted to a remote UE. According to an embodiment, the specific message may be transmitted through a dedicated channel. The specific message may include 1) the access class information of a relay UE to 6) the information related to a connected mode or idle mode state of a relay UE among the information related to the access control of the model A discovery described in FIG. 11 and the discovery response message of the model B discovery described in FIG. 12*a*. The specific message may be provided to at least one UE through a dedicated channel or broadcasted to all UEs. According to an embodiment, the specific message may be transmitted by using one of PC5-Signalling, PC5-Discovery, PC5-U, RRC connection establishment.

According to an embodiment, when the remote UE performs a connection to a network, signaling transmission or data transmission, the remote UE may check whether the relay UE applies the access control and may transmit a message for checking whether the relay UE applies the access control to the relay UE. The message for checking whether the relay UE applies the access control may be a new PC5 message, NAS signaling message or RRC signaling message. The message for checking whether the relay UE applies the access control may be transmitted to the relay UE through a dedicated channel. The relay UE may transmit a response message to the remote UE in response to the message for checking whether the relay UE applies the access control. The response message may include 1) the access class information of a relay UE to 6) the information related to a connected mode or idle mode state of a relay UE among the information related to the access control of the model A discovery described in FIG. 11 and the discovery response message of the model B discovery described in FIG. 12*a*. The specific message may be provided to at least one UE through a dedicated channel or broadcasted to all UEs. According to an embodiment, the specific message may be transmitted by using one of PC5-Signalling, PC5-Discovery, PC5-U, RRC connection establishment.

2) The case that an access control is performed by a relay UE

Without regard to the relay UE selection according to the model A discovery and the model B discovery, a remote UE identify the access control performed by a relay UE.

According to an embodiment, in the case that a relay UE applies the access control in a network congestion situation, a specific message may be transmitted to a remote UE. According to an embodiment, the specific message may be transmitted through a dedicated channel. The specific message may include 1) the access class information of a relay UE to 6) the information related to a connected mode or idle mode state of a relay UE among the information related to the access control of the model A discovery described in FIG. 11 or 1) the access class information of a remote UE to 3) the configuration information set to a remote UE among the discovery response message of the model B discovery described in FIG. 12*b*. The specific message may be provided to at least one UE through a dedicated channel or broadcasted to all UEs. According to an embodiment, the specific message may be transmitted by using one of PC5-Signalling, PC5-Discovery, PC5-U, RRC connection establishment.

According to an embodiment, when the remote UE performs a connection to a network, signaling transmission or data transmission, the remote UE may check whether the relay UE applies the access control and may transmit a message for checking whether the relay UE applies the access control to the relay UE. The message for checking whether the relay UE applies the access control may be a new PC5 message, NAS signaling message or RRC signaling message. The message for checking whether the relay UE applies the access control may be transmitted to the relay UE through a dedicated channel. The relay UE may transmit a response message to the remote UE in response to the message for checking whether the relay UE applies the access control. The response message may include 1) the access class information of a relay UE to 6) the information related to a connected mode or idle mode state of a relay UE among the information related to the access control of the model A discovery described in FIG. 11 or 1) the access class information of a remote UE to 3) the configuration information set to a remote UE among the discovery response message of the model B discovery described in FIG. 12b. The specific message may be provided to at least one UE through a dedicated channel or broadcasted to all UEs. According to an embodiment, the specific message may be transmitted by using one of PC5-Signalling, PC5-Discovery, PC5-U, RRC connection establishment.

IV. The case of ACB, SSAC and SCB skip (1) The case of Access Class Barring (ACB)

1) The case that an access control is performed by a remote UE

In the case that a remote UE receives the information related to the access control described in the model A discovery or the discovery response message described in the model B discovery, when the remote UE connects a connection to a network, transmits signaling or transmits data through PC5-Signalling, PC5-Discovery, PC5-U or RRC connection establishment, the remote UE may perform the Access Class Barring (ACB) mechanism when switched from an idle mode to a connected mode.

In the case that a network provides barring information related to the ACB and the Service Specific Access Control (SSAC), the remote UE may perform the access control by performing the ACB and the SSAC simultaneously (double barring check).

2) The case that an access control is performed by a relay UE

In the case that a remote UE receives the information related to the access control described in the model A discovery or the discovery response message described in the model B discovery and is connected to a relay UE, when the remote UE connects a connection to a network, transmits signaling or transmits data through PC5-Signalling, PC5-Discovery, PC5-U or RRC connection establishment, the remote UE may not perform the ACB but transmit signaling and data to the relay UE. The relay UE that receives the signaling and data from the remote UE may perform the Access Class Barring (ACB) mechanism when switched from an idle mode to a connected mode to transmit the received signaling and data to a network.

Later, when the relay UE performs the ACB, the relay UE may perform the following operation.

i) When the relay UE performs the ACB based on its own access class information and passes through the ACB, the relay UE may transmit the signaling and/or data received from the remote UE to a network. That is, the relay UE may perform the ACB based on the access class information of the relay UE without regard to the access class information of the remote UE, the access control mechanism information and/or the configuration information.

ii) When the relay UE performs the ACB without regard to its own access class information based on the access class information of the remote UE received from the remote UE and passes through the ACB, the relay UE may transmit the signaling and/or data received from the remote UE to a network.

iii) The signaling and/or data transmission method described in i) and ii) above may be performed based on separate configuration information provided by a network (eNB, MME/SGSN or service provider network). The network may transmit the separate configuration information determined through OMA-DM, USIM, SIB or a dedicated channel to the remote UE. The network may perform the signaling and/or data transmission methods according to the two embodiments separately or perform two embodiments in combined manner.

In the case that a network provides barring information related to the ACB and the Service Specific Access Control (SSAC), the remote UE may perform the access control by performing the ACB and the SSAC simultaneously (double barring check).

(2) The case of Service Specific Access Control (SSAC)

1) The case that an access control is performed by a remote UE

In the case that a remote UE receives the information related to the access control described in the model A discovery or the discovery response message described in the model B discovery, when the remote UE connects a connection to a network, transmits signaling or transmits data for MMTEL voice and MMTEL video through PC5-Signalling, PC5-Discovery, PC5-U or RRC connection establishment, the remote may perform the SSAC mechanism without regard to an idle mode or a connected mode.

In the case that a network provides barring information related to the ACB and the Service Specific Access Control (SSAC), the remote UE may perform the access control by performing the ACB and the SSAC simultaneously.

2) The case that an access control is performed by a relay UE i) In the case that a remote UE receives the information related to the access control described in the model A discovery or the discovery response message described in the model B discovery and is connected to a relay UE, when the remote connects a connection to a network, transmits signaling or transmits data for MMTEL voice and MMTEL video through PC5-Signalling, PC5-Discovery, PC5-U or RRC connection establishment, the relay UE may not perform the SSAC, but when the relay UE is in an idle mode, the relay UE may perform the ACB described in (1) above.

On the other hand, in the case that the relay UE is in a connected mode, the relay UE may not perform the SSAC and the ACB but transmit the signaling or the data to a network.

ii) Meanwhile, in the case that a remote UE receives the information related to the access control described in the model A discovery or the discovery response message described in the model B discovery and is connected to a relay UE, the remote UE may receive the parameter information (ACB, SSAC, ACB skip, EAB and ACDC) related to the access control mechanism provided by a serving network from the relay UE through SIB (SIB2, SIB14 or new SIB). The parameter information related to the access control mechanism may include ACB barring parameter, barring rate, barring time, SSAC barring parameter for MINITEL voice and MMTEL video, ACB skip parameter for MINI-TEL voice and MMTEL video, SMS over IP and SMS over NAS, ACDC parameter (barring rate, barring time for ACDC category), barring parameter for CSFB, emergency call and information for high priority.

When the remote UE performs a connection to a network for MMTEL voice and MINITEL video through PC5-Signalling, PC5-Discovery, PC5-U or RRC connection establishment, signaling transmission and/or data transmission, the remote may perform the SSAC mechanism without regard to an idle mode or a connected mode.

At this time, the relay UE may operate as described in 1) above. In addition, in the case that a network provides barring information related to the ACB and the Service Specific Access Control (SSAC), the remote UE may perform the ACB and the SSAC simultaneously (double barring check).

(3) The Case of ACB Skip

1) The case that an access control is performed by a remote UE

In the case that a remote UE receives the information related to the access control described in the model A discovery or the discovery response message described in the model B discovery, when the remote UE connects a connection to a network, transmits signaling or transmits data through PC5-Signalling, PC5-Discovery, PC5-U or RRC connection establishment, the remote may perform the ACB skip mechanism when switched from an idle mode to a connected mode.

The ACB skip mechanism may mean requesting network connection/signal transmission/data transmission without performing the ACB mechanism when performing network connection/signal transmission/data transmission for MMTEL voice, MMTEL video, SMS (over IP), SMS (over NAS).

2) The case that an access control is performed by a relay UE

In the case that a remote UE receives the information related to the access control described in the model A discovery or the discovery response message described in the model B discovery and is connected to a relay UE, when the remote UE connects a connection to a network, transmits signaling or transmits data through PC5-Signalling, PC5-Discovery, PC5-U or RRC connection establishment, the remote may perform the ACB skip mechanism when switched from an idle mode to a connected mode.

The ACB skip mechanism may mean requesting network connection/signal transmission/data transmission without performing the ACB mechanism when performing network connection/signal transmission/data transmission for MMTEL voice, MMTEL video, SMS (over IP), SMS (over NAS).

V. The Cases of EAB, ACDC (1) The case of Extended Access Barring (EAB)

1) The case that an access control is performed by a remote UE

In the case that a remote UE is configured to perform the EAB through a Management Object (MO) provided from a network or USIM and the remote UE receives the information related to the access control described in the model A discovery or the discovery response message described in the model B discovery, when the remote UE connects a connection to a network, transmits signaling or transmits data through PC5-Signalling, PC5-Discovery, PC5-U or RRC connection establishment, the remote may perform the EAB mechanism when switched from an idle mode to a connected mode.

In addition, in the case that a remote UE is configured to perform overriding EAB, with the EAB or separately from the EAB, through a Management Object (MO) provided from a network or USIM and the remote UE receives the information related to the access control described in the model A discovery or the discovery response message described in the model B discovery, when the remote UE performs a connection to a network through PC5-Signalling, PC5-Discovery, PC5-U or RRC connection establishment, signaling transmission or data transmission, the remote may perform the overriding EAB mechanism when switched from an idle mode to a connected mode.

2) The case that an access control is performed by a relay UE

In the case that a remote UE is configured to perform the EAB and/or the overriding EAB through a Management Object (MO) provided from a network or USIM and the remote UE discovers and selects a relay UE through the model A discovery and the model B discovery, when the remote UE connects a connection to a network, transmits signaling or transmits data through PC5-Signalling, PC5-Discovery, PC5-U or RRC connection establishment (i.e., when switched from an idle mode to a connected mode), the remote UE may provide the EAB configuration information and/or the overriding EAB configuration information to the relay UE.

In the case that a relay UE is configured to perform the EAB or the overriding EAB by a network and provided with the EAB configuration information from a remote UE, the remote UE may perform the EAB mechanism when performing network connection/signal transmission/data transmission. According to an embodiment, the EAB mechanism may be performed according to the content described in 3GPP TS 22.011, TS 24.301, TS 24.008 and TS 36.331.

In addition, in the case that a relay UE is configured to perform the EAB or the overriding EAB by a network and provided with the EAB configuration information from a remote UE, the remote UE may perform the overriding EAB mechanism when performing network connection/signal transmission/data transmission. That is, the remote UE may bypass the EAB without performing the EAB when performing network connection/signal transmission/data transmission. According to an embodiment, the EAB mechanism may be performed according to the content described in 3GPP TS 22.011, TS 24.301, TS 24.008 and TS 36.331.

According to an embodiment, in the case that a relay UE is not configured to perform the EAB or the overriding EAB by a network and provided with the EAB configuration information from a remote UE, the relay UE may not perform the EAB mechanism but perform the ACB mechanism.

In addition, in the case that a relay UE is not configured to perform the EAB or the overriding EAB by a network and provided with the EAB configuration information and/or the overriding EAB configuration information from a remote UE, the relay UE may not perform the EAB mechanism but perform the ACB mechanism, or bypass the EAB mechanism, the overriding EAB mechanism and the ACB mechanism without performing the EAB mechanism, the overriding EAB mechanism and the ACB mechanism. That is, whether to perform the EAB mechanism, the overriding EAB mechanism and/or the ACB mechanism may be determined according to a network configuration (policy, information).

(2) The case of Application specific Congestion control for Data Communication (ACDC)

1) The case that an access control is performed by a remote UE

In the case that a remote UE is configured to perform the ACDC through a Management Object (MO) provided from a network or USIM and the remote UE receives the information related to the access control described in the model A discovery or the discovery response message described in the model B discovery, when the remote UE connects a connection to a network, transmits signaling or transmits data through PC5-Signalling, PC5-Discovery, PC5-U or RRC connection establishment, the remote UE may perform the ACDC mechanism when switched from an idle mode to a connected mode.

Meanwhile, for the ACB, SSAC, ACB skip and the EAB, ACDC, even in the case that a remote UE is configured to perform NAS signaling low priority and/or overriding NAS signaling low priority through a Management Object (MO) provided from a network or USIM, the remote UE may perform the corresponding access control mechanism.

2) The case that an access control is performed by a relay UE

In the case that a remote UE is configured to perform the ACDC through a Management Object (MO) provided from a network or USIM and the remote UE is connected to a relay UE through the information related to the access control described in the model A discovery or the discovery response message described in the model B discovery, when the remote UE connects a connection to a network, transmits signaling or transmits data (switched from an idle mode to a connected mode) through PC5-Signalling, PC5-Discovery, PC5-U or RRC connection establishment, the remote UE may provide the ACDC category information for the network connection, the signaling transmission or the data transmission to the relay UE.

In the case that a relay UE is configured to perform the ACDC by a network and receives the ACDC category information from the remote UE, the relay UE may perform the ACDC mechanism based on the ACDC category information. According to an embodiment, the ACDC mechanism may be performed according to the content described in 3GPP TS 22.011, TS 24.301, TS 24.008 and TS 36.331.

Meanwhile, the remote UE may provide App-ID (or App-IDs) information to the relay UE. According to an embodiment, the App-ID (or App-IDs) information may be provided together with the ACDC category. At this time, the NAS of the remote UE may provide the App-ID (or App-IDs) information to the AS (RRC) together with the ACDC category.

On the other hand, according to an embodiment, the App-ID (or App-IDs) information may be provided separately from the ACDC category. At this time, the NAS of the remote UE may provide the App-ID (or App-IDs) information to the AS (RRC) separately from the ACDC category.

In the case that the relay UE is configured to perform the ACDC through a Management Object (MO) provided from a network or USIM and the relay UE receives the ACDC category information and the App-ID or only the App-ID from the remote UE, the relay UE may determine the ACDC category information of the relay UE that corresponds to the received App-ID and perform the ACDC mechanism based on the determined ACDC category information.

The AS (RRC) of the relay UE may provide the App-ID information received from the remote UE to the NAS of the relay UE. The NAS of the relay UE may determine the ACDC category information that corresponds to the received App-ID and transmit the ACDC category information determined by the AS of the relay UE. The AS of the relay UE may perform the ACDC mechanism based on the determined ACDC category information. The ACDC mechanism may be performed according to the content described in 3GPP TS 22.011, TS 24.301, TS 24.008 and TS 36.331.

According to an embodiment, in the case that a relay UE is not configured to perform the ACDC through a Management Object (MO) provided from a network or USIM and the relay UE is provided with the ACDC category information from the remote UE, the relay UE may not perform the ACDC mechanism but perform the ACB mechanism. According to another embodiment, in the case that a relay UE is not configured to perform the ACDC through a Management Object (MO) provided from a network or USIM and the relay UE is provided with the ACDC category information from the remote UE, the relay UE may not perform the access control mechanism.

In addition, according to an embodiment, in the case that a relay UE is not configured to perform the ACDC through a Management Object (MO) provided from a network or USIM and the relay UE receives the ACDC category information or the App-ID or only the App-ID from the remote UE, the relay UE may not perform the ACDC mechanism but perform the ACB mechanism. According to another embodiment, in the case that a relay UE is not configured to perform the ACDC through a Management Object (MO) provided from a network or USIM and the relay UE receives the ACDC category information or the App-ID or only the App-ID from the remote UE, the relay UE may not perform the access control mechanism.

Meanwhile, for the ACB, SSAC, ACB skip and the EAB, ACDC, even in the case that a remote UE and/or relay UE is configured to perform NAS signaling low priority and/or overriding NAS signaling low priority through a Management Object (MO) provided from a network or USIM, the remote UE may perform the corresponding access control mechanism.

VI. After performing access control mechanism for ACB, SSAC, ACB skip, EAB or ACDC, the operation of remote UE and relay UE (1) Operation of remote UE 1) The case that an access control is performed by a remote UE In the case that a remote UE passes through the access control mechanism for the ACB, SSAC, ACB skip, EAB or ACDC described above (i.e., in the case that an access to a cell is successful), the remote UE may request a connection for network connection/signaling transmission/data transmission to a relay UE by using PC5-Signalling, PC5-Discovery, PC5-U or RRC connection establishment.

When the remote UE passes through the access control mechanism for the ACB, SSAC, ACB skip, EAB or ACDC by the AS (RRC), the NAS or AS (RRC) of the remote UE may request a connection for network connection/signaling transmission/data transmission to a relay UE by using PC5-Signalling, PC5-Discovery, PC5-U or RRC connection establishment.

On the other hand, in the case that a remote UE fails to pass through the access control mechanism for the ACB, SSAC, ACB skip, EAB or ACDC (i.e., in the case that an access to a cell is barred), the AS (RRC) of the remote UE may send connection failure information to the NAS of the remote UE, and the NAS of the remote UE may not perform NAS signaling request for network connection/signaling transmission/data transmission until the NAS of the remote UE receives information representing that the access barring is alleviated from the AS (RRC) of the remote UE. At this time, the remote UE may operate a barring timer. When the barring timer expires, the AS (RRC) of the remote UE may inform to the NAS that the access barring is alleviated.

When the remote UE passes through the access control mechanism for the ACB, SSAC, ACB skip, EAB or ACDC, the remote UE may request a connection for network connection/signaling transmission/data transmission to a relay UE by using PC5-Signalling, PC5-Discovery, PC5-U or RRC connection establishment. When the remote UE receives a connection request reject (or failure) message in response to the request, the AS (RRC) of the remote UE may transmit connection failure information to the NAS of the remote UE. At this time, the NAS of the remote UE may stop the NAS signaling request for the corresponding network connection/signaling transmission/data transmission.

The connection failure information may include information related to a failure cause such as low layer failure, radio link failure or cell barred. The AS (RRC) of the remote UE may transmit the information related to a failure cause to the NAS of the remote UE. At this time, the information related to a failure cause may be information specifying transmission/connection failure from the relay UE. The information related to a failure cause may further include a value for the barring timer.

The AS (RRC) of the remote UE may not perform the NAS signaling request for the network connection/signaling transmission/data transmission until the AS (RRC) of the remote UE transmit the connection failure information representing a failure of transmission/connection to the NAS of the remote UE, and the NAS of the remote UE receives the information representing that the access barring is alleviated from the AS (RRC) of the remote UE. At this time, the remote UE may operate the barring timer. When the barring timer expires, the AS (RRC) of the remote UE may inform to the NAS that the access barring is alleviated.

On the other hand, when the connection request for network connection/signaling transmission/data transmission is accepted by the relay UE, the remote UE may transmit the signaling (NAS signaling) or data to transmit to the relay UE.

Alternatively, after the remote UE performs the access control mechanism for the ACB, SSAC, ACB skip, EAB or ACDC, when passing through the access control mechanism, without regard to the acceptance of the connection request for network connection/signaling transmission/data transmission, the remote UE may transmit the signaling (NAS signaling) or data to transmit to the relay UE.

2) The case that an access control is performed by a relay UE

In the case that a relay UE fails to pass through the access control mechanism for the ACB, SSAC, ACB skip, EAB or ACDC (i.e., in the case that an access to a cell is barred), the relay UE may transmit failure information representing that a connection is barred to the remote UE.

The AS of the remote UE may send the failure information to the NAS of the remote UE. The NAS of the remote UE may not perform NAS signaling request for network connection, signaling transmission or data transmission until the NAS of the remote UE receives information representing that the access barring is alleviated from the AS (RRC) of the remote UE.

(2) Operation of relay UE

1) The case that an access control is performed by a remote UE

In the case that a remote UE passes through the access control mechanism for the ACB, SSAC, ACB skip, EAB or ACDC after performing the access control mechanism, the remote UE may request a connection for network connection/signaling transmission/data transmission to a relay UE by using PC5-Signalling, PC5-Discovery, PC5-U or RRC connection establishment.

When the relay UE receives the request, in the case that the relay UE is in an idle mode, the relay UE may perform a connection request with a network (eNB) to be switched to a connected mode, and when the relay UE is successfully connected to the network, the relay UE may accept the connection request received from the remote UE. Later, when the relay UE receives the signaling (NAS signaling) or data that the remote UE is intended to transmit from the remote UE, the relay UE may transmit the received signaling (NAS signaling) or data to the network by using one of PC5-Signalling, PC5-Discovery, PC5-U or RRC connection establishment.

In the case that the access control mechanism of the remote UE passes through and the relay UE receives the signaling (NAS signaling) or data that the remote UE is intended to transmit from the remote UE, the relay UE may transmit the signaling or data to the network without performing an additional access control mechanism.

In the case that the connection request with the network (eNB) is rejected (or failed) owing to low layer failure, radio link failure or cell barred, the relay UE may transmit connection failure information representing that a connection request for the network connection/signaling transmission/data transmission of the remote UE is rejected (or failed) to the remote UE.

The connection failure information may include information related to a failure cause such as low layer failure, radio link failure or cell barred. The information related to a failure cause may be information specifying transmission/connection failure from the relay UE. The information related to a failure cause may further include a value for the barring timer.

The AS (RRC) of the remote UE may not perform the NAS signaling request for the network connection/signaling transmission/data transmission until the AS (RRC) of the remote UE transmit the connection failure information representing a failure of transmission/connection to the NAS of the remote UE, and the NAS of the remote UE receives the information representing that the access barring is alleviated from the AS (RRC) of the remote UE. At this time, the remote UE may operate the barring timer by using value for the barring timer provided from the relay UE. When the barring timer expires, the AS (RRC) of the remote UE may inform to the NAS that the access barring is alleviated.

When the access to a cell is barred, in the case that a remote UE passes through the access control mechanism for the ACB, SSAC, ACB skip, EAB or ACDC after performing the access control mechanism, the relay UE may receive the signaling (NAS signaling) or data intended to transmit from the remote UE, and at this time, the relay UE may disregard that the access to a cell is barred, without performing the additional access control mechanism (overriding access control for Remote UE signaling/connection), but transmit the signaling (NAS signaling) or data to the network.

2) The case that an access control is performed by a relay UE

In the case that a relay UE passes through the access control mechanism for the ACB, SSAC, ACB skip, EAB or ACDC after performing the access control mechanism, the relay UE that receives a connection for network connection/signaling transmission/data transmission from a remote UE may try a connection with a network (eNB) and accept the connection request when the connection is successfully established.

Later, when the relay UE receives signaling (NAS signaling) or data from the remote UE, the relay UE may transmit the received signaling (NAS signaling) or data to the network by using PC5-Signalling, PC5-Discovery, PC5-U or RRC connection establishment. In the case that the relay UE passes through the access control mechanism and receives the signaling (NAS signaling) or data, the relay UE may not perform the access control mechanism for transmitting the signaling (NAS signaling) or data.

According to an embodiment, after performing the access control mechanism for the ACB, SSAC, ACB skip, EAB or ACDC, in the case that the access control mechanism is not passed or a connection request with a network (eNB) is rejected owing to lower layer failure or radio link failure, the relay UE may transmit a connection request reject message of the remote UE to the remote UE. The connection request reject message may include a cause value that the connection request is rejected. The cause value may be a value that specifies the connection request failure. According to an embodiment, the remote UE may further receive a timer value.

At this time, the AS (RRC) of the remote UE may transmit connection failure information representing that the transmission/connection is failed to the NAS of the remote UE, and the NAS of the remote UE may not perform NAS signaling request for network connection/signaling transmission/data transmission until the NAS of the remote UE receives information representing that the access barring is alleviated from the AS of the remote UE.

At this time, the remote UE may operate a barring timer based on the timer value received from the relay UE. When the barring timer expires, the AS (RRC) of the remote UE may inform to the NAS that the access barring is alleviated.

VII. Relay UE in Connected Mode

1) The case that an access control is performed by a remote UE

According to an embodiment, when a remote UE performs network connection/signaling transmission/data transmission by using one of PC5-Signalling, PC5-Discovery, PC5-U or RRC connection establishment, in the case that the relay UE is in an idle mode, the relay UE may be switched to a connected mode. At this time, when the AS of the relay UE receives a request for network connection/signaling transmission/data transmission from the remote UE, the AS of the relay UE may perform an RRC connection establishment procedure for transmitting the network connection/signaling transmission/data transmission received from the remote UE to a network LTE-Uu (or Relay-user plane). According to an embodiment, the relay UE may perform additional (separate) access control mechanism to perform the RRC connection establishment procedure.

According to another embodiment, a remote UE performs network connection/signaling transmission/data transmission by using one of PC5-Signalling, PC5-Discovery, PC5-U or RRC connection establishment, in the case that the relay UE is in a connected mode, without the RRC connection establishment procedure of the AS (RRC) of the relay UE (i.e., the remote UE does not perform the access control mechanism described in the present specification), the relay UE may transmit network connection/signaling/data requested by the remote UE to the network.

2) The case that an access control is performed by a relay UE

According to an embodiment, when a remote UE performs network connection/signaling transmission/data transmission by using one of PC5-Signalling, PC5-Discovery, PC5-U or RRC connection establishment, in the case that the relay UE is in a connected mode, without the RRC connection establishment procedure of the AS (RRC) of the relay UE (i.e., without performing the access control mechanism), the relay UE may transmit the network connection/signaling transmission/data transmission to the network through LTE-Uu (or Relay-user plane).

According to another embodiment, a remote UE performs network connection/signaling transmission/data transmission by using one of PC5-Signalling, PC5-Discovery, PC5-U or RRC connection establishment, in the case that the relay UE is in a connected mode, the remote UE may identify that the relay UE is in the connected mode through information on whether the relay UE is in the connected mode or the idle mode. At this time, the relay UE may transmit the network connection/signaling transmission/data transmission to the network without the access control mechanism.

Figure 13A:
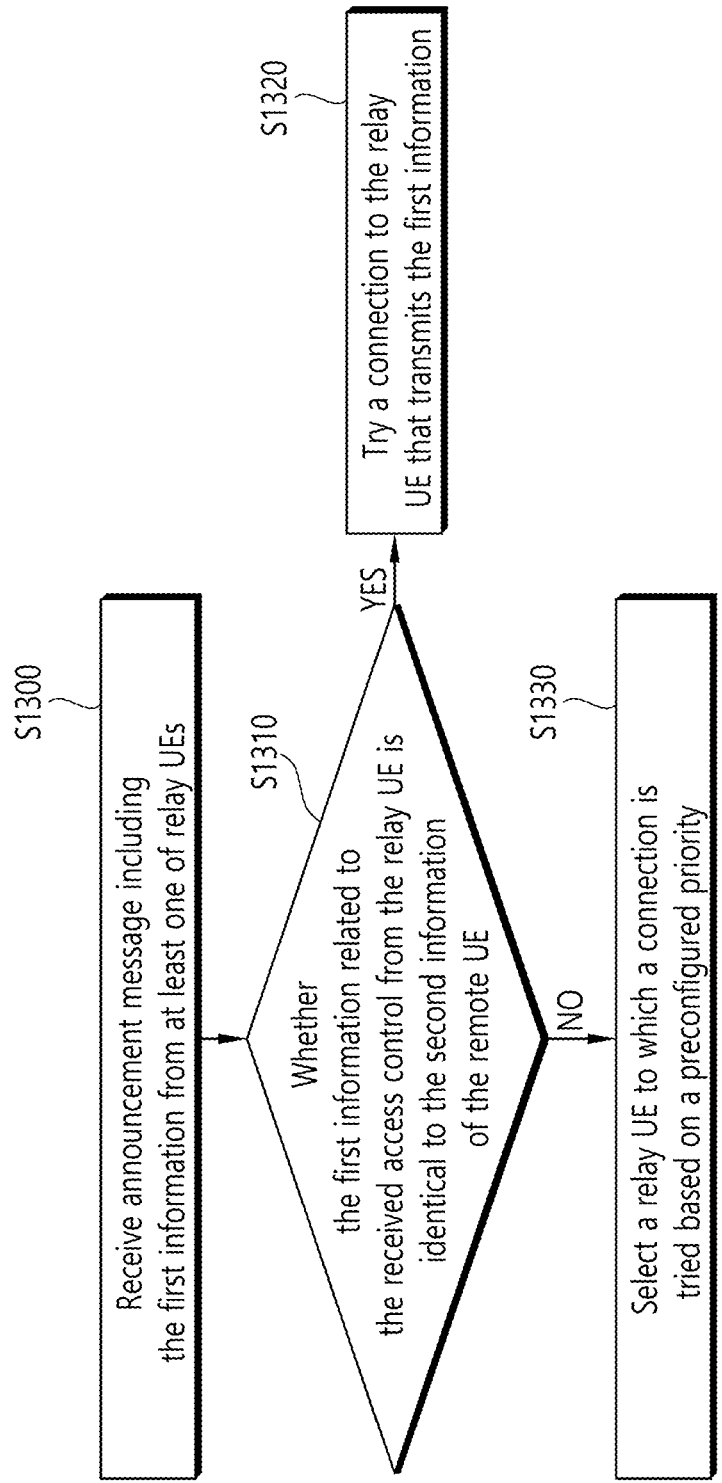
FIG. 13a is a flowchart illustrating a procedure that a remote UE selects a relay UE in a situation in which the access control is applied owing to network congestion according to an embodiment of the present specification.

FIG. 13a is a flowchart illustrating a procedure that a remote UE selects a relay UE in a situation in which the access control is applied owing to network congestion according to an embodiment of the present specification.

Referring to FIG. 13a, a remote UE may receive first information for the access control from at least one relay UE (step, S1300). As described in FIG. 11, according to the model A discovery, the first information may be information for the access control. On the other hand, according to the model B discovery, the first information may be the discovery response message.

The first information may include the access class information of the relay UE, the access control mechanism information of the relay UE and the configuration information of the relay UE.

First, the remote UE may compare whether the first information is identical to the second information of the remote UE (step, S1310). The second information may include the access class information of the remote UE, the access control mechanism information of the remote UE and the configuration information of the remote UE.

At this time, in the case that information included in the first information is completely identical to information included in the second information of the remote UE (YES in step S1310), the relay UE may transmit a response message to the remote UE that transmits the first information which is identical among the remote UEs and try a connection with the relay UE (step, S1320).

On the other hand, in the case that information included in the first information is not completely identical to information included in the second information of the remote UE (NO in step S1310), the relay UE may try a connection with a relay UE to which one or a part of the access class information, the access control mechanism information and the configuration information included in the first information is identical (step, S1330).

According to an embodiment, among the priority, the highest priority is whether the access class is identical, the secondary priority is whether the configuration information is identical, the third priority is whether the Extended Access Barring (EAB) information is identical in the access control mechanism information, and the fourth priority is whether the Application specific Congestion control for Data Communication (ACDC) information is identical in the access control mechanism information. However, according to an embodiment, the priority may be changed. The remote UE may select a relay UE to try a connection by comparing with the highest priority to the fourth priority by using a preconfigured priority.

FIG. 13b is a flowchart illustrating a procedure that a relay UE selects a remote UE to transmit a response message in a situation in which the access control is applied owing to network congestion according to an embodiment of the present specification.

Referring to FIG. 13b, a relay UE may receive an announcement message including first information from at least one remote UE (step, S1350). According to an embodiment, the announcement message may be PC5 solicitation message. The first information may include the access class information of the remote UE, the access control mechanism information of the remote UE and the configuration information of the remote UE.

The relay UE may compare whether the first information is identical to the second information of the relay UE (step, S1360). The second information may include the access class information of the relay UE, the access control mechanism information of the relay UE and the configuration information of the relay UE.

At this time, in the case that the first information is completely identical to the second information (YES in step S1360), the relay UE may transmit a response message to the remote UE that transmits the first information which is identical among the remote UEs (step, S1370). According to an embodiment, the response message may be PC5 Response message.

On the other hand, in the case that information included in the first information is not completely identical to information included in the second information of the remote UE (NO in step S1360), the relay UE may transmit a response message to a remote UE to which one or a part of the access class information, the access control mechanism information and the configuration information included in the first information is identical (step, S1380).

According to an embodiment, among the priority, the first priority is whether the access class is identical, the second priority is whether the configuration information is identical, the third priority is whether the Extended Access Barring (EAB) information is identical in the access control mechanism information, and the fourth priority is whether the Application specific Congestion control for Data Communication (ACDC) information is identical in the access control mechanism information. However, according to an embodiment, the priority may be changed. The remote UE may select a relay UE to try a connection by comparing with the highest priority to the fourth priority by using a preconfigured priority.

The description described above may be implemented with hardware.

Figure 14:
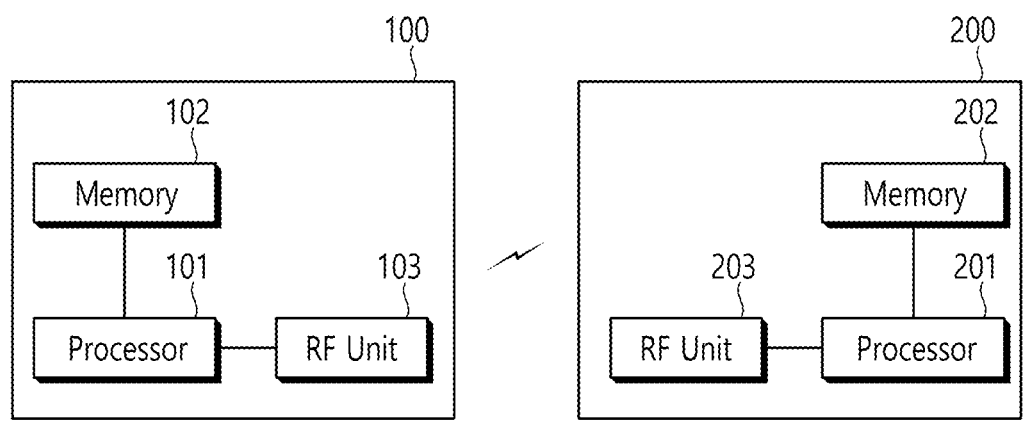
FIG. 14 is a block diagram illustrating a wireless communication system that implements the embodiments of the present invention.

FIG. 14 is a block diagram illustrating a wireless communication system in which an embodiment proposed in the present specification is implemented.

A base station 200 includes a processor 201, a memory 202, and a radio frequency (RF) unit 203. The memory 202 is coupled with the processor 201 and stores a variety of information for driving the processor 201. The RF unit 203 is coupled to the processor 201 and transmits and/or receives a radio signal. The processor 201 implements the proposed functions, procedures, and/or methods. In the embodiment described above, an operation of the base station may be implemented by the processor 201.

A wireless device 100 includes a processor 101, a memory 102, and an RF unit 103. The memory 102 is coupled to the processor 101 and stores a variety of information for driving the processor 101. The RF unit 103 is coupled to the processor 101 and transmits and/or receives a radio signal. The processor 61 implements the proposed functions, procedures, and/or methods.

In the embodiment described above, an operation of the wireless device 100 may be implemented by the processor 101.

The processors may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules may be stored in memories and executed by processors. The memories may be implemented within the processors or external to the processors in which case those can be communicatively coupled to the processors via various means as is known in the art.

In the above-described embodiments, methods are described based on a flowchart as a series of steps or blocks. However, the present disclosure is not limited to the order of steps. Some steps may occur simultaneously or in a different order than the order of the steps described above. Further, those skilled in the art will appreciate that the step shown in the flowchart is not exclusive. It will be understood that other steps may be included or that one or more steps in the flowchart may be deleted without affecting the scope of the present disclosure.

What is claimed is:

1. A method for selecting one of relay User Equipments (UEs) in a situation in which an access control is applied owing to network congestion, the method performed by a remote UE and comprising:
   receiving first information for the access control from at least one of the relay UEs;
   comparing the first information with second information of the remote UE, wherein each of the first and second information includes at least three kinds of information including access class information, access control mechanism information, and configuration information, and wherein the access control mechanism information represents at least one of (i) access class barring (ACB) mechanism, (ii) Extended Access Barring (EAB) mechanism, or (iii) Application specific Congestion control for Data Communication (ACDC) mechanism;
   selecting a first relay UE among the relay UEs, based on that the first relay UE has transmitted the first information including the at least three kinds of the information which are completely identical to the at least three kinds of information included in the second information of the remote UE; and
   trying a connection with the selected first relay UE.

2. The method of claim 1, further comprising:
   selecting a second relay UE, among the relay UEs, according to a priority, based on that the first relay UE has transmitted the first information including the at least three kinds of the information which are partially identical to the at least three kinds of information included in the second information of the remote UE.

3. The method of claim 2, wherein the priority represents an order of determining whether the access class information of the remote UE, the access control mechanism information of the remote UE and the configuration information of the remote UE included in the second information is identical to the first information.

4. The method of claim 3, wherein selecting the second relay UE among the relay UEs includes:
   determining whether a relay UE having the access class information identical to the access class information of the remote UE is present based on the priority; and
   based on a determination that a relay UE having the access class information identical to the access class information of the remote UE is present:
   selecting the relay UE having the identical access class information.

5. The method of claim 4, wherein selecting the second relay UE among the relay UEs further includes:
  based on a determination that a relay UE having the access class information identical to the access class information of the remote UE is not present:
    (i) determining whether a relay UE having the configuration information identical to the configuration information of the remote UE is present; and
    (ii) based on a determination that a relay UE having the configuration information identical to the configuration information of the remote UE is present: selecting the relay UE having the identical configuration information,
  wherein the configuration information includes at least one of (i) Non-Access Stratum (NAS) signaling low priority indicator or (ii) Overriding NAS signaling low priority indicator.

6. The method of claim 5, wherein selecting the second relay UE among the relay UEs further includes:
  based on a determination that a relay UE having the configuration information identical to the configuration information of the remote UE is not present:
    (i) determining thirdly whether a relay UE having Extended Access Barring (EAB) information and overriding EAB information identical to EAB information and overriding EAB information of the remote UE is present; and
    (ii) based on a determination that a relay UE having the EAB information and overriding EAB information identical to the EAB information and overriding EAB information of the remote UE is present: selecting the relay UE having the identical EAB information and overriding EAB information.

7. The method of claim 6, wherein selecting the second relay UE among the relay UEs further includes:
  based on a determination that a relay UE having the EAB information and overriding EAB information identical to the EAB information and overriding EAB information of the remote UE is not present:
    (i) determining fourthly whether a relay UE having Application specific Congestion control for Data Communication (ACDC) information among the access control mechanism information identical to ACDC information of the remote UE is present among the access control mechanism information; and
    (ii) based on a determination that a relay UE having the ACDC information identical to the EAB information and overriding EAB information of the remote UE is present: selecting the relay UE having the identical ACDC information.

8. The method of claim 1, wherein the first information further includes (i) information related to the access control and (ii) information related to a start of the access control, and
  wherein the remote UE identifies that the access control by the relay UE is started based on one of (i) the information related to the access control and (ii) the information related to a start of the access control, included in the first information.

9. The method of claim 8, wherein based on the remote UE identifying that the access control is started:
  the remote UE reselects another relay UE, other than the relay UE selected based on the one of (i) the information related to the access control and (ii) the information related to a start of the access control, included in the first information.

10. The method of claim 1, wherein the first information includes a relay service code and a user information ID of the relay UE, and
  wherein the second information includes a relay service code and a user information ID of the remote UE.

11. The method of claim 1, wherein selecting the first relay UE includes:
  based on a presence of a plurality of relay UEs that transmit first information completely identical to the second information: selecting a relay UE of which a signal strength is a strongest among the relay UEs that transmit the first information.

12. The method of claim 1, wherein selecting the first relay UE includes:
  based on a presence of a plurality of relay UEs that transmit first information completely identical to the second information: selecting a relay UE based on a service provider policy or a configuration of network.

13. A remote User Equipment (UE) configured to select one of relay UEs in a situation in which an access control is applied owing to network congestion, the remote UE comprising:
  a Radio Frequency (RF) unit;
  at least one processor; and
  at least one computer memory operably connectable to the at least one processor and storing instructions that, based on being executed by the at least one processor, perform operations comprising:
  receiving, through the RF unit, first information for the access control from at least one of the relay UEs;
  comparing the first information with second information of the remote UE, wherein each of the first and second information includes at least three kinds of information including access class information, access control mechanism information and configuration information, and wherein the access control mechanism information represents at least one of (i) access class barring (ACB) mechanism, (ii) Extended Access Barring (EAB) mechanism, or (iii) Application specific Congestion control for Data Communication (ACDC) mechanism;
  selecting a relay UE among the relay UEs, based on that the relay UE has transmitted the first information including the at least three kinds of the information which are completely identical to the at least three kinds of information included in the second information of the remote UE;
  select a relay UE among the relay UEs according to a priority, based on that the relay UE has transmitted the first information including the at least three kinds of the information which are partially identical to the at least three kinds of information included in the second information of the remote UE; and
  trying a connection with the selected relay UE.

* * * * *